United States Patent
Park et al.

(10) Patent No.: US 12,493,482 B2
(45) Date of Patent: Dec. 9, 2025

(54) SIGNAL PROCESSING DEVICE AND DISPLAY APPARATUS FOR VEHICLES INCLUDING THE SAME

(71) Applicant: LG ELECTRONICS INC., Seoul (KR)

(72) Inventors: Suho Park, Seoul (KR); Minhyoung Kim, Seoul (KR); Dongwoo Han, Seoul (KR); Yonghyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

(21) Appl. No.: 18/036,381

(22) PCT Filed: Nov. 8, 2021

(86) PCT No.: PCT/KR2021/016097
§ 371 (c)(1),
(2) Date: May 10, 2023

(87) PCT Pub. No.: WO2022/103093
PCT Pub. Date: May 19, 2022

(65) Prior Publication Data
US 2023/0409370 A1    Dec. 21, 2023

(30) Foreign Application Priority Data
Nov. 10, 2020  (KR) .......... 10-2020-0149179

(51) Int. Cl.
*G06F 9/455*  (2018.01)
*B60K 35/10*  (2024.01)
(Continued)

(52) U.S. Cl.
CPC .......... *G06F 9/45558* (2013.01); *B60K 35/10* (2024.01); *B60K 35/22* (2024.01);
(Continued)

(58) Field of Classification Search
None
See application file for complete search history.

(56) References Cited

U.S. PATENT DOCUMENTS

| 9,959,124 B1 | 5/2018 | Herbeck et al. |
| 2011/0093650 A1* | 4/2011 | Kwon .................. G11C 16/225 |
| | | 711/E12.001 |

(Continued)

FOREIGN PATENT DOCUMENTS

| JP | 2014151770 | 8/2014 |
| KR | 1020080018016 | 2/2008 |

(Continued)

OTHER PUBLICATIONS

Korean Intellectual Property Office Application No. 10-2023-7000174, Notice of Allowance dated Nov. 27, 2023, 3 pages.
(Continued)

*Primary Examiner* — Bradley A Teets
*Assistant Examiner* — Melissa A Headly
(74) *Attorney, Agent, or Firm* — LEE, HONG, DEGERMAN, KANG & WAIMEY

(57) ABSTRACT

The signal processing device includes a processor to execute a plurality of virtual machines, a first memory to store a file corresponding to a first application executed based on entry into a standby mode, and a second memory to load a file stored in the first memory based on the switching from the standby mode to an active mode, wherein the processor is configured to restore the first application based on the file loaded to the second memory during the switching from the standby mode to the active mode, terminate a second application executed in another virtual machine based on the entry into the standby mode, turn on the other virtual machine based on the switching from the standby mode to the active mode, and execute the second application after an operating system is executed. Accordingly, it is possible to shorten a booting period or wakeup period of some applications that are executed in the vehicle.

19 Claims, 23 Drawing Sheets

(51) Int. Cl.
  *B60K 35/22* (2024.01)
  *B60K 35/23* (2024.01)
  *B60K 35/26* (2024.01)
  *B60K 35/28* (2024.01)
  *B60K 35/29* (2024.01)
  *B60K 35/60* (2024.01)
  *G06F 3/041* (2006.01)
  *G06F 3/14* (2006.01)

(52) U.S. Cl.
  CPC .............. *B60K 35/26* (2024.01); *B60K 35/28* (2024.01); *B60K 35/29* (2024.01); *B60K 35/60* (2024.01); *G06F 3/0416* (2013.01); *G06F 3/1423* (2013.01); *B60K 35/23* (2024.01); *B60K 2360/1438* (2024.01); *B60K 2360/344* (2024.01); *G06F 2009/45575* (2013.01)

(56) References Cited

U.S. PATENT DOCUMENTS

| | | |
|---|---|---|
| 2012/0284475 A1 | 11/2012 | Zaarur |
| 2013/0166866 A1 | 6/2013 | Yerushalmi et al. |
| 2015/0178883 A1* | 6/2015 | McKenzie ................ G06T 1/20 345/522 |
| 2016/0328254 A1* | 11/2016 | Ahmed ................ G06F 9/45545 |
| 2018/0147913 A1* | 5/2018 | Bergin ................ B60H 1/00657 |
| 2020/0159562 A1 | 5/2020 | Lee et al. |

FOREIGN PATENT DOCUMENTS

| | | | |
|---|---|---|---|
| KR | 10-2011-0094764 | 8/2011 | |
| KR | 1020170104372 | 9/2017 | |
| KR | 1020190100507 | 8/2019 | |
| KR | 10-2356316 | 1/2022 | |
| WO | 2020-061805 | 4/2020 | |
| WO | WO-2020061805 A1 * | 4/2020 | ........... G06F 9/4401 |

OTHER PUBLICATIONS

Karthik et al., "Hypervisor based approach for integrated cockpit solutions," Sep. 2018, 7 pages.
PCT International Application No. PCT/KR2021/016097, International Search Report dated Feb. 25, 2022, 4 pages.
Korean Intellectual Property Office Application No. 10-2023-7000174, Office Action dated Jul. 26, 2023, 4 pages.
European Patent Office Application Serial No. 21892261.5, Search Report dated Jun. 4, 2024, 12 pages.

* cited by examiner

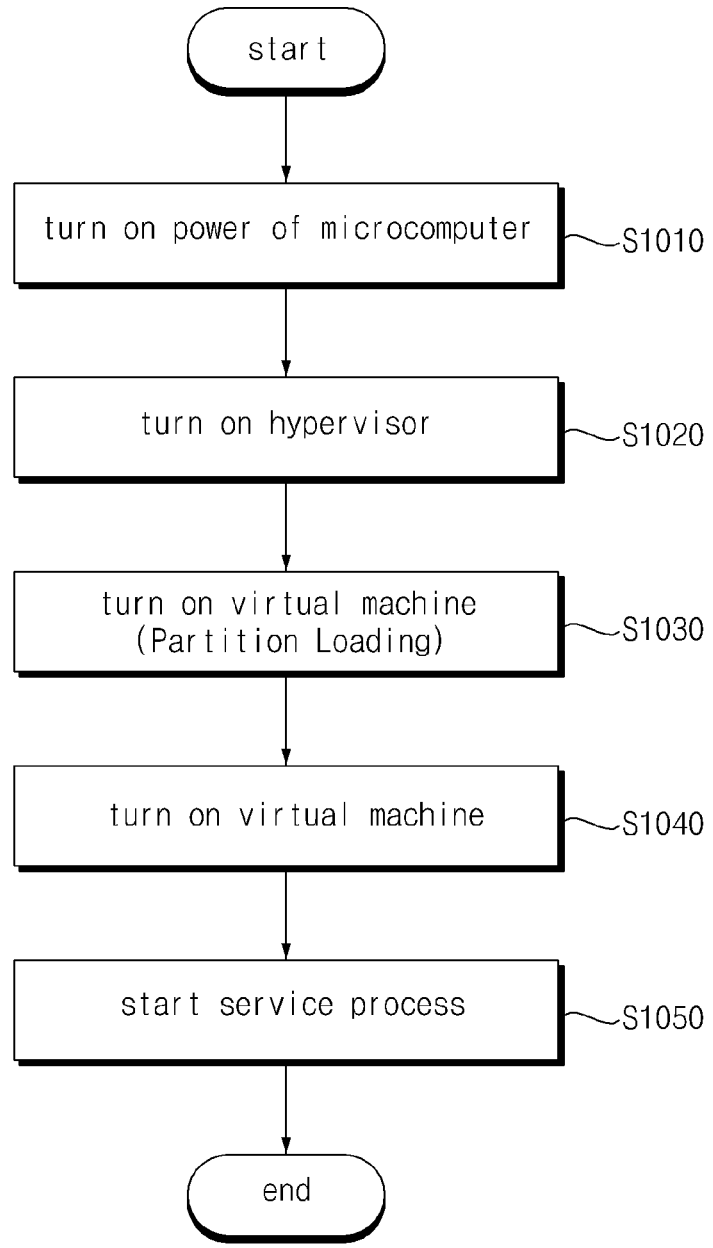

SIGNAL PROCESSING DEVICE AND DISPLAY APPARATUS FOR VEHICLES INCLUDING THE SAME

CROSS-REFERENCE TO RELATED APPLICATIONS

This application is the National Stage filing under 35 U.S.C. 371 of International Application No. PCT/KR2021/016097, filed on Nov. 8, 2021, which claims the benefit of earlier filing date and right of priority to Korean Application No. 10-2020-0149179 filed on Nov. 10, 2020, the contents of which are all incorporated by reference herein in their entirety.

BACKGROUND

1. Field of the Disclosure

The present disclosure relates to a signal processing device and a display apparatus for vehicles including the same, and more particularly to a signal processing device capable of shortening a booting period or wakeup period of some applications executed in a vehicle, and a display apparatus for vehicles including the same.

2. Description of the Related Art

A vehicle is an apparatus that a driver moves in a desired direction. A representative example of the vehicle is a car.

Meanwhile, a display apparatus for vehicles is located in the vehicle for convenience of users who use the vehicle.

For example, a display is disposed in a cluster in order to display various kinds of information. Meanwhile, in order to display vehicle driving information, various displays, such as an audio video navigation (AVN) display, are located in the vehicle, in addition to the cluster.

In the case in which the number of displays in the display apparatus for vehicles is increased, however, signal processing for the displays is complicated.

Meanwhile, when a display apparatus for vehicles enters a standby mode and then is switched to an active mode, a booting period or a wakeup period is significantly required.

SUMMARY

An object of the present disclosure is to provide a signal processing device capable of shortening a booting period or wakeup period of some applications executed in a vehicle, and a display apparatus for vehicles including the same.

Another object of the present disclosure is to provide a signal processing device capable of shortening a booting period or wakeup period of some applications executed in a vehicle even when the number of virtual machines increases, and a display apparatus for vehicles including the same.

A further object of the present disclosure is to provide a signal processing device capable of shortening a booting period or wakeup period of some applications run in a vehicle even if operating systems of a plurality of virtual machines are different, and a display apparatus for vehicles including the same.

In accordance with an aspect of the present disclosure, a signal processing device includes: a processor configured to execute a plurality of virtual machines for a plurality of displays mounted on a vehicle; a first memory configured to store a file corresponding to a first application executed in any one of the plurality of virtual machines based on entry into a standby mode; and a second memory configured to load a file stored in the first memory based on the switching from the standby mode to an active mode, wherein the processor is configured to restore the first application based on the file loaded to the second memory during the switching from the standby mode to the active mode, and the processor is configured to terminate a second application executed in another virtual machine among the plurality of virtual machines based on the entry into the standby mode, turn on the other virtual machine based on the switching from the standby mode to the active mode, and execute the second application after an operating system is executed. Accordingly, the booting period or wakeup period of some applications running in the vehicle can be shortened. In addition, standby power consumption can be reduced by varying a booting period or a wakeup period by classifying applications.

Meanwhile, in the standby mode, the first memory may maintain power only in a region storing the file and turns off power in other regions.

Meanwhile, based on the switching from the standby mode to the active mode, the processor may be configured to restore the first application at a first time point, display a first image corresponding to the first application and control to display a second image indicating being loaded in response to non-execution of the second application.

Meanwhile, based on the switching from the standby mode to the active mode, the processor may be configured to continuously display the first image at a second time point after the first time point and control to display a third image corresponding to the execution of the second application.

Meanwhile, the first application may include any one of a system check application, a cluster application, or a rear camera application, and the second application may include any one of a home screen application and a media playback application.

Meanwhile, the first application may operate based on a first operating system, and the second application may operate based on a second operating system different from the first operating system.

Meanwhile, the first application may be executed in a first guest virtual machine among the plurality of virtual machines, and the second application may be executed in a second guest virtual machine among the plurality of virtual machines.

Meanwhile, the first application may be executed in a server virtual machine among the plurality of virtual machines, and the second application may be executed in a guest virtual machine among the plurality of virtual machines.

Meanwhile, the first memory may further store an image file including an operating system, and the processor may terminate the second application executed in another virtual machine among the plurality of virtual machines based on entry into the standby mode, and the processor may turn on the other virtual machine based on the switching from the standby mode to the active mode, and after the operating system is executed in the second memory based on loading of an image file stored in the first memory, the processor may be configured to execute the second application.

Meanwhile, based on the switching from the standby mode to the active mode, the processor may turn on a hypervisor after power-ON of a microcomputer and turn on the other virtual machine after turning on the hypervisor, and after the operating system is executed in the second memory based on loading of the image file stored in the first memory, the processor may be configured to execute the second application.

Meanwhile, the processor may execute a first virtual machine to a third virtual machine on the hypervisor in the processor, and the second virtual machine may operate for a first display and the third virtual machine operates for a second display.

Meanwhile, the first virtual machine in the processor may receive a touch input for the first display or the second display, and transmit information on the touch input to the second virtual machine or the third virtual machine.

Meanwhile, the first virtual machine may be configured to store coordinate information of the touch input in a shared memory.

Meanwhile, the first virtual machine may be configured to transmit a buffer index regarding the shared memory to the second virtual machine or the third virtual machine, and the second virtual machine or the third virtual machine may be configured to read the coordinate information of the touch input written in the shared memory based on the received buffer index.

Meanwhile, the first virtual machine may include an input and output server interface, each of the second virtual machine and the third virtual machine may include an input and output client interface, the input and output server interface in the first virtual machine may be configured to store coordinate information of the touch input in a shared memory, and an input and output client interface in the second virtual machine or the third virtual machine may be configured to read the coordinate information of the touch input written in the shared memory.

Meanwhile, the processor may further execute a fourth virtual machine operating for a third display on a hypervisor in the processor.

Meanwhile, the first virtual machine may receive and process wheel speed sensor data of the vehicle, and transmit an overlay indicating the processed wheel speed sensor data or speed information corresponding to the processed wheel speed sensor data to at least one of the second virtual machine or the third virtual machine.

In accordance with another aspect of the present disclosure, a signal processing device includes: a processor configured to execute a plurality of virtual machines for a plurality of displays mounted on a vehicle; a first memory configured to store a file corresponding to a first application executed in any one of the plurality of virtual machines based on entry into a standby mode; and a second memory configured to load a file stored in the first memory based on the switching from the standby mode to an active mode, wherein the processor is configured to terminate execution of a second application based on the entry into the standby mode, and based on the switching from the standby mode to the active mode, the processor is configured to restore the first application at a first time point, display a first image corresponding to the first application, and display a second image indicating being loaded in response to non-execution of the second application.

Meanwhile, based on the switching from the standby mode to the active mode, the processor may be configured to continuously display the first image at a second time point after the first time point and may be configured to display a third image corresponding to the execution of the second application.

In accordance with another aspect of the present disclosure, a display apparatus for vehicles includes: a first display; a second display; and a signal processing device including a processor configured to perform signal processing for the first display and the second display, wherein the signal processing device includes: a processor configured to execute a plurality of virtual machines for a plurality of displays mounted on a vehicle; a first memory configured to store a file corresponding to a first application executed in any one of the plurality of virtual machines based on entry into a standby mode; and a second memory configured to load a file stored in the first memory based on the switching from the standby mode to an active mode, wherein the processor is configured to restore the first application based on the file loaded to the second memory during the switching from the standby mode to the active mode, and the processor is configured to terminate a second application executed in another virtual machine among the plurality of virtual machines based on the entry into the standby mode, turn on the other virtual machine based on the switching from the standby mode to the active mode, and execute the second application after an operating system is executed.

Effect of the Disclosure

The signal processing device according to an embodiment of the present disclosure includes: a processor configured to execute a plurality of virtual machines for a plurality of displays mounted on a vehicle; a first memory configured to store a file corresponding to a first application executed in any one of the plurality of virtual machines based on entry into a standby mode; and a second memory configured to load a file stored in the first memory based on the switching from the standby mode to an active mode, wherein the processor is configured to restore the first application based on the file loaded to the second memory during the switching from the standby mode to the active mode, and the processor is configured to terminate a second application executed in another virtual machine among the plurality of virtual machines based on the entry into the standby mode, turn on the other virtual machine based on the switching from the standby mode to the active mode, and execute the second application after an operating system is executed. Accordingly, a booting period or wakeup period of some applications running in the vehicle can be shortened. In addition, standby power consumption can be reduced by varying a booting period or a wakeup period by classifying applications.

Meanwhile, in the standby mode, the first memory may maintain power only in a region storing the file and turns off power in other regions. Accordingly, in the standby mode, since power is supplied to only a partial region of the first memory instead of the entire region, standby power consumption can be significantly reduced.

Meanwhile, based on the switching from the standby mode to the active mode, the processor may be configured to restore the first application at a first time point, display a first image corresponding to the first application and control to display a second image indicating being loaded in response to non-execution of the second application. Thus, standby power consumption can be reduced by varying a booting period or a wakeup period by classifying applications.

Meanwhile, based on the switching from the standby mode to the active mode, the processor may be configured to continuously display the first image at a second time point after the first time point and control to display a third image corresponding to the execution of the second application.

Thus, standby power consumption can be reduced by varying a booting period or a wakeup period by classifying applications.

Meanwhile, the first application may include any one of a system check application, a cluster application, or a rear camera application, and the second application may include any one of a home screen application and a media playback application. Thus, standby power consumption can be reduced by varying a booting period or a wakeup period by classifying applications.

Meanwhile, the first application may operate based on a first operating system, and the second application may operate based on a second operating system different from the first operating system. Accordingly, a booting period or wakeup period of some applications running in the vehicle can be shortened. In addition, standby power consumption can be reduced by varying a booting period or a wakeup period by classifying applications.

Meanwhile, the first application may be executed in a first guest virtual machine among the plurality of virtual machines, and the second application may be executed in a second guest virtual machine among the plurality of virtual machines. Accordingly, a booting period or wakeup period of some applications running in the vehicle can be shortened. In addition, standby power consumption can be reduced by varying a booting period or a wakeup period by classifying applications.

Meanwhile, the first application may be executed in a server virtual machine among the plurality of virtual machines, and the second application may be executed in a guest virtual machine among the plurality of virtual machines. Accordingly, a booting period or wakeup period of some applications running in the vehicle can be shortened. In addition, standby power consumption can be reduced by varying a booting period or a wakeup period by classifying applications.

Meanwhile, the first memory may further store an image file including an operating system, and the processor may terminate the second application executed in another virtual machine among the plurality of virtual machines based on entry into the standby mode, and the processor may turn on the other virtual machine based on the switching from the standby mode to the active mode, and after the operating system is executed in the second memory based on loading of an image file stored in the first memory, the processor may be configured to execute the second application. Accordingly, a booting period or wakeup period of some applications running in the vehicle can be shortened. In addition, standby power consumption can be reduced by varying a booting period or a wakeup period by classifying applications.

Meanwhile, based on the switching from the standby mode to the active mode, the processor may turn on a hypervisor after power-ON of a microcomputer and turn on the other virtual machine after turning on the hypervisor, and after the operating system is executed in the second memory based on loading of the image file stored in the first memory, the processor may be configured to execute the second application. Accordingly, a booting period or wakeup period of some applications running in the vehicle can be shortened. In addition, standby power consumption can be reduced by varying a booting period or a wakeup period by classifying applications.

Meanwhile, the processor may execute a first virtual machine to a third virtual machine on the hypervisor in the processor, and the second virtual machine may operate for a first display and the third virtual machine operates for a second display. Accordingly, it is possible to efficiently process data through a plurality of virtual machines.

Meanwhile, the first virtual machine in the processor may receive a touch input for the first display or the second display, and transmit information on the touch input to the second virtual machine or the third virtual machine. Accordingly, it is possible to quickly and accurately process a touch input. In addition, even if the number of executed virtual machines increases, a touch input can be processed quickly and accurately. Furthermore, even if operating systems of the plurality of virtual machines are different, it is possible to quickly and accurately process a touch input.

Meanwhile, the first virtual machine may be configured to store coordinate information of the touch input in a shared memory. Accordingly, it is possible to quickly and accurately process a touch input.

Meanwhile, the first virtual machine may be configured to transmit a buffer index regarding the shared memory to the second virtual machine or the third virtual machine, and the second virtual machine or the third virtual machine may be configured to read the coordinate information of the touch input written in the shared memory based on the received buffer index. Accordingly, it is possible to quickly and accurately process a touch input.

Meanwhile, the first virtual machine may include an input and output server interface, each of the second virtual machine and the third virtual machine may include an input and output client interface, the input and output server interface in the first virtual machine may be configured to store coordinate information of the touch input in a shared memory, and an input and output client interface in the second virtual machine or the third virtual machine may be configured to read the coordinate information of the touch input written in the shared memory. Accordingly, it is possible to quickly and accurately process a touch input.

Meanwhile, the processor may further execute a fourth virtual machine operating for a third display on a hypervisor in the processor. Accordingly, it is possible to efficiently process data for a plurality of displays through a plurality of virtual machines.

Meanwhile, the first virtual machine may receive and process wheel speed sensor data of the vehicle, and transmit an overlay indicating the processed wheel speed sensor data or speed information corresponding to the processed wheel speed sensor data to at least one of the second virtual machine or the third virtual machine. Accordingly, wheel speed sensor data of the vehicle can be shared with at least one virtual machine or the like.

The signal processing device according to an embodiment of the present disclosure includes: a processor configured to execute a plurality of virtual machines for a plurality of displays mounted on a vehicle; a first memory configured to store a file corresponding to a first application executed in any one of the plurality of virtual machines based on entry into a standby mode; and a second memory configured to load a file stored in the first memory based on the switching from the standby mode to an active mode, wherein the processor is configured to terminate execution of a second application based on the entry into the standby mode, and based on the switching from the standby mode to the active mode, the processor is configured to restore the first application at a first time point, display a first image corresponding to the first application, and display a second image indicating being loaded in response to non-execution of the second application. Accordingly, a booting period or wakeup period of some applications running in the vehicle can be shortened. In addition, standby power consumption can be reduced by varying a booting period or a wakeup period by classifying applications.

Meanwhile, based on the switching from the standby mode to the active mode, the processor may be configured to continuously display the first image at a second time point after the first time point, and display a third image corresponding to the execution of the second application. Thus, standby power consumption can be reduced by varying a booting period or a wakeup period by classifying applications.

The display apparatus for vehicles according to an embodiment of the present disclosure includes: a first display; a second display; and a signal processing device including a processor configured to perform signal processing for the first display and the second display, wherein the signal processing device includes: a processor configured to execute a plurality of virtual machines for a plurality of displays mounted on a vehicle; a first memory configured to store a file corresponding to a first application executed in any one of the plurality of virtual machines based on entry into a standby mode; and a second memory configured to load a file stored in the first memory based on the switching from the standby mode to an active mode, wherein the processor is configured to restore the first application based on the file loaded to the second memory during the switching from the standby mode to the active mode, and the processor is configured to terminate a second application executed in another virtual machine among the plurality of virtual machines based on the entry into the standby mode, turn on the other virtual machine based on the switching from the standby mode to the active mode, and execute the second application after an operating system is executed. Accordingly, a booting period or wakeup period of some applications running in the vehicle can be shortened. In addition, standby power consumption can be reduced by varying a booting period or a wakeup period by classifying applications.

BRIEF DESCRIPTION OF THE DRAWINGS

FIG. 10 is a flowchart illustrating an operating method of a signal processing device related to the present disclosure;

FIGS. 11C to 15B are views referred to in the description of FIG. 11A or 11B.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1A:
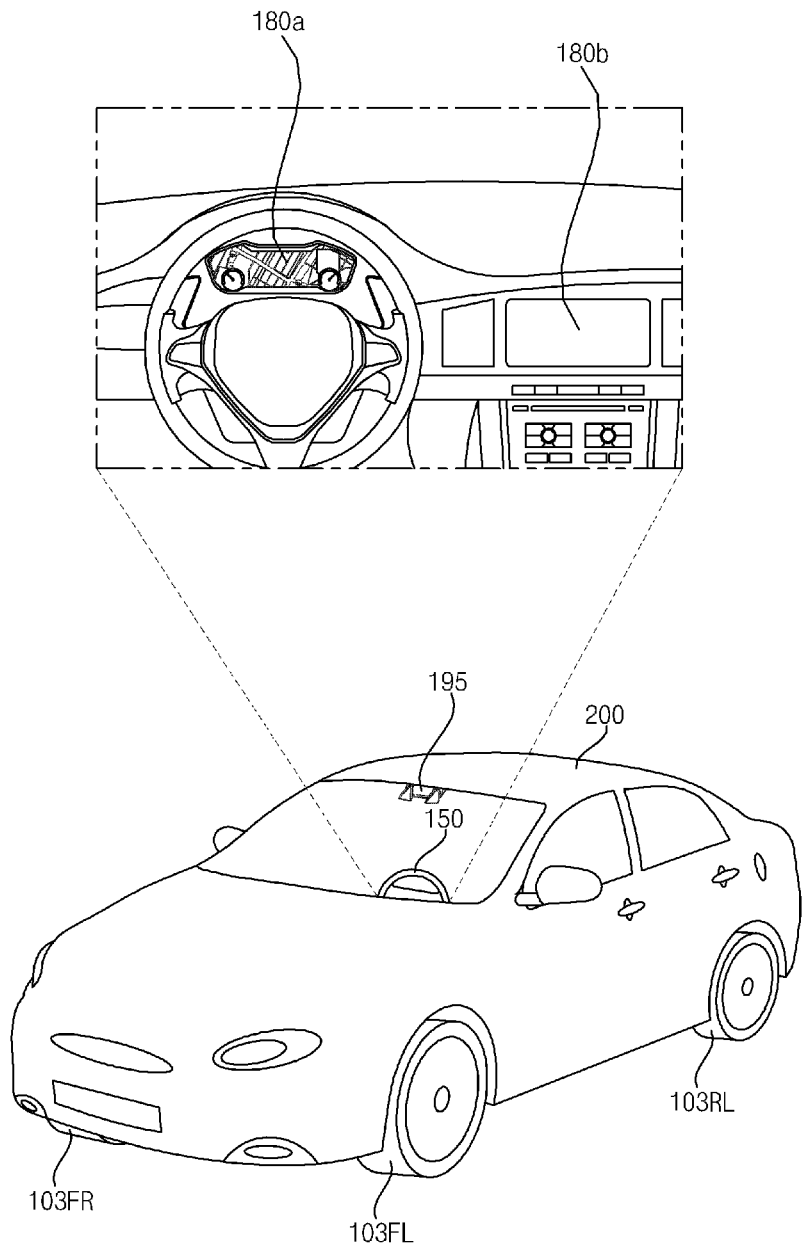
FIG. 1A is a view showing an example of the exterior and interior of a vehicle.

FIG. 1A is a view showing an example of the exterior and interior of a vehicle.

Referring to the figure, the vehicle 200 is moved by a plurality of wheels 103FR, 103FL, 103RL, . . . rotated by a power source and a steering wheel 150 configured to adjust an advancing direction of the vehicle 200.

Meanwhile, the vehicle 200 may be provided with a camera 195 configured to acquire an image of the front of the vehicle.

Meanwhile, the vehicle 200 may be further provided therein with a plurality of displays 180a to 180c configured to display images and information.

In FIG. 1A, a cluster display 180a and an audio video navigation (AVN) display 180b are illustrated as the plurality of displays 180a to 180c. In addition, a head up display (HUD) may also be used.

Meanwhile, the audio video navigation (AVN) display 180b may also be called a center information display.

An embodiment of the present disclosure proposes a method of shortening a booting period or wakeup period of some executed applications in the vehicle display device 100 including a plurality of displays 180a to 180c. This will be described with reference to FIG. 10 below.

Meanwhile, the vehicle 200 described in this specification may be a concept including all of a vehicle having an engine as a power source, a hybrid vehicle having an engine and an electric motor as a power source, and an electric vehicle having an electric motor as a power source.

Figure 1B:
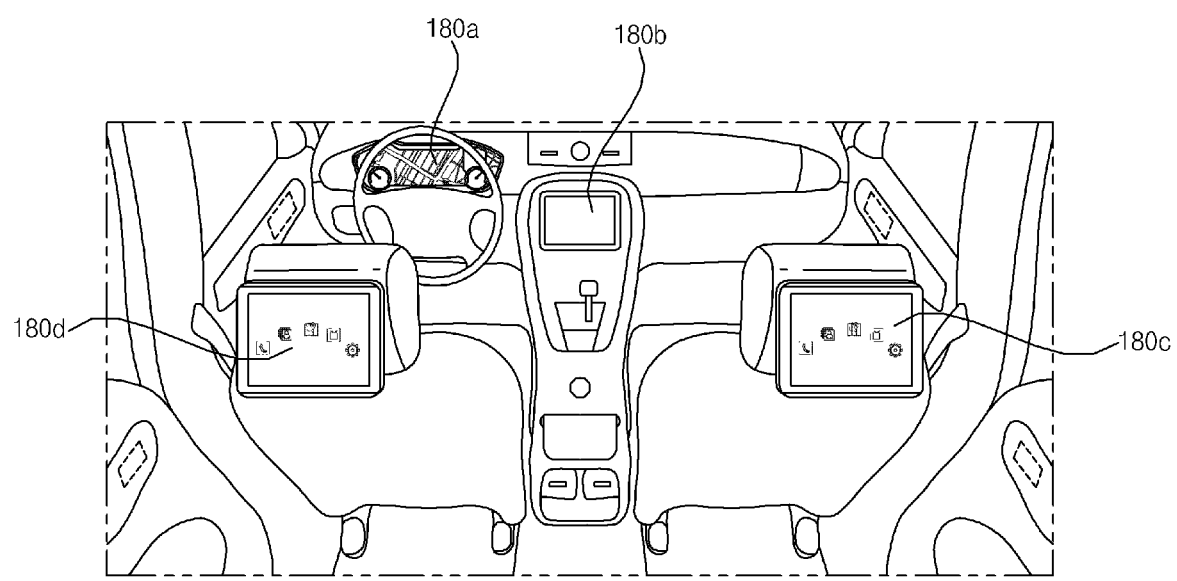
FIG. 1B is a view showing another example of the interior of the vehicle.

FIG. 1B is a view showing another example of the interior of the vehicle.

Referring to the figure, a cluster display 180a, an audio video navigation (AVN) display 180b, rear seat entertainment displays 180c and 180d, and a rear-view mirror display (not shown) may be located in the vehicle.

Figure 2:
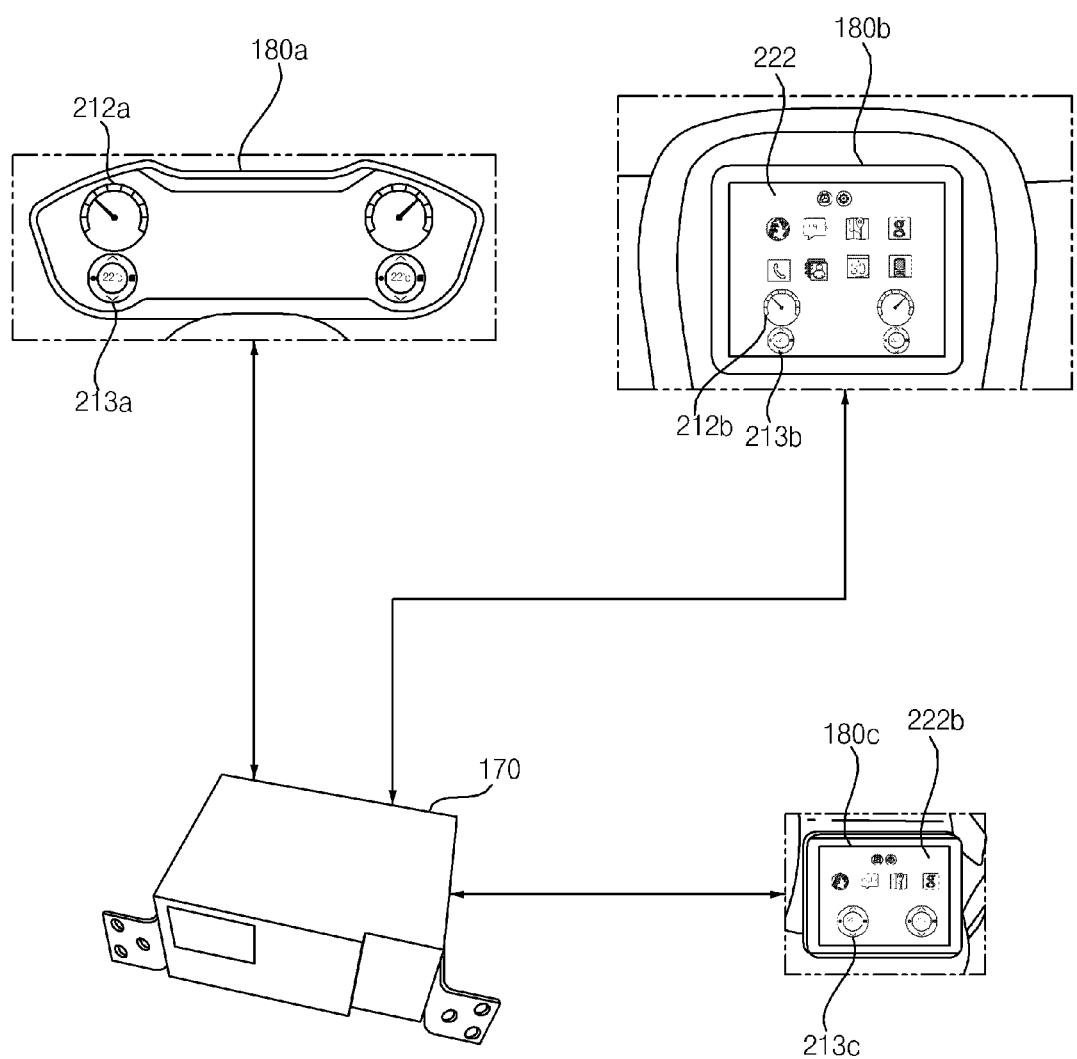
FIG. 2 is a view showing the external appearance of a display apparatus for vehicles according to an embodiment of the present disclosure.

FIG. 2 is a view showing the external appearance of a display apparatus for vehicles according to an embodiment of the present disclosure.

The display apparatus 100 for vehicles according to the embodiment of the present disclosure may include a plurality of displays 180a to 180c and a signal processing device 170 configured to perform signal processing in order to display images and information on the plurality of displays 180a to 180c.

The first display 180a, which is one of the plurality of displays 180a to 180c, may be a cluster display 180a configured to display a driving state and operation information, and the second display 180b may be an audio video navigation (AVN) display 180b configured to display vehicle driving information, a navigation map, various kinds of entertainment information, or an image.

Meanwhile, among the plurality of displays 180a to 180c, the third display 180c may be a rear seat entertainment display 180c for displaying driving state information, simple navigation information, various entertainment information or images.

The signal processing device 170 may have a processor 175 provided therein, and first to third virtual machines 520 to 550 may be executed by a hypervisor 505 in the processor 175.

The second virtual machine 530 may be operated for the first display 180a, the third virtual machine 540 may be operated for the second display 180b, and the fourth virtual machine 540 may operate for the third display 180c. Accordingly, it is possible to efficiently process data through the plurality of virtual machines 520 to 550.

Meanwhile, the first virtual machine 520 in the processor 175 may be configured to set a shared memory 508 based on the hypervisor 505 for transmission of the same data to the second virtual machine 530 to the fourth virtual machine 550. Consequently, a plurality of displays, among the first display 180a to the third display 180c in the vehicle, may display the same information or the same images in a synchronized state.

Meanwhile, the first virtual machine 520 in the processor 175 shares at least some of data with a plurality of virtual machines, among the second virtual machine 530 to the fourth virtual machine 550 for divided processing of data. Consequently, the plurality of virtual machines for the plurality of displays in the vehicle may divide and process data.

Meanwhile, the first virtual machine 520 in the processor 175 may receive and process wheel speed sensor data of the vehicle, and may transmit the processed wheel speed sensor data to at least one of the second virtual machine 530 to the fourth virtual machine 550.

Consequently, at least one virtual machine may share the wheel speed sensor data of the vehicle or an overlay indicating speed information corresponding to the processed wheel speed sensor data.

Meanwhile, some of the plurality of displays 180a to 180c may be operated based on a Linux Operating System (OS), and others may be operated based on a Web Operating System (OS).

The signal processing device 170 according to an embodiment of the present disclosure may be configured to perform a first booting mode for fast booting or wakeup on some of the plurality of virtual machines 510 to 550 for driving the plurality of displays 180a to 180c operated under various operating systems OS and perform a second booting mode, which is later than the first booting mode, on some others.

Accordingly, the booting period or wakeup period of some applications running in the vehicle can be shortened. In addition, standby power consumption can be reduced by varying a booting period or a wakeup period by classifying applications.

In response to a touch input to any one of the displays 180a to 180c configured to be operated under various operating systems, the signal processing device 170 according to an embodiment of the present disclosure may be configured to rapidly and accurately process the touch input.

Meanwhile, FIG. 2 illustrates that a vehicle speed indicator 212a and an in-vehicle temperature indicator 213a are displayed on the first display 180a, a home screen 222 including a plurality of applications, a vehicle speed indicator 212b, and an in-vehicle temperature indicator 213b is displayed on the second display 180b, and a home screen 222b including a plurality of applications and an in-vehicle temperature indicator 213c is displayed on the third display 180c.

Figure 3:
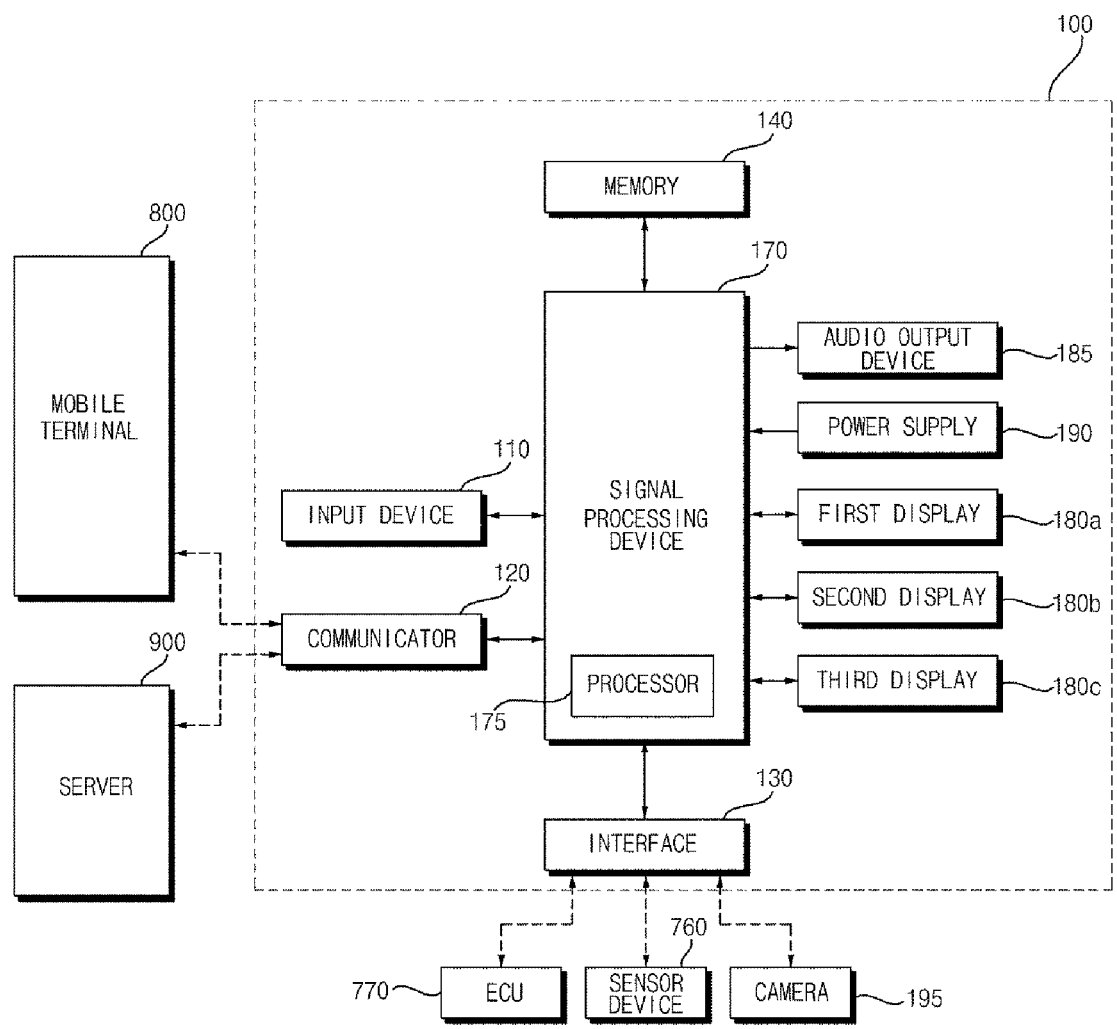
FIG. 3 illustrates an example of an internal block diagram of the display apparatus for vehicles of FIG. 2.

FIG. 3 illustrates an example of an internal block diagram of the display apparatus for vehicles according to the embodiment of the present disclosure.

Referring to the figure, the display apparatus 100 for vehicles according to the embodiment of the present disclosure may include an input device 110, a communicator 120, an interface 130, a signal processing device 170, a plurality of displays 180a to 180c, an audio output device 185, and a power supply 190.

The input device 110 may include a physical button or pad for button input or touch input.

Meanwhile, the input device 110 may include a touch sensor (not shown) configured to sense touch input to the displays 180a, 180b, and 180c.

Meanwhile, the input device 110 may include a microphone (not shown) for user voice input.

The communicator 120 may wirelessly exchange data with a mobile terminal 800 or a server 900.

In particular, the communicator 120 may wirelessly exchange data with a mobile terminal of a vehicle driver. Any of various data communication schemes, such as Bluetooth, Wi-Fi, WIFI Direct, and APIX, may be used as a wireless data communication scheme.

The communicator 120 may receive weather information and road traffic situation information, such as transport protocol expert group (TPEG) information, from the mobile terminal 800 or the server 900. To this end, the communicator 120 may include a mobile communication module (not shown).

The interface 130 may receive sensor information from an electronic control unit (ECU) 770 or a sensor device 760, and may transmit the received information to the signal processing device 170.

Here, the sensor information may include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, or in-vehicle humidity information.

The sensor information may be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor. Meanwhile, the position module may include a GPS module configured to receive GPS information.

Meanwhile, the interface 130 may receive front-of-vehicle image data, side-of-vehicle image data, rear-of-vehicle image data, and obstacle-around-vehicle distance information from a camera 195 or lidar (not shown), and may transmit the received information to the signal processing device 170.

The audio output device 185 may convert an electrical signal from the signal processing device 170 into an audio signal, and may output the audio signal. To this end, the audio output device 185 may include a speaker.

The power supply 190 may supply power necessary to operate components under control of the signal processing device 170. In particular, the power supply 190 may receive power from a battery in the vehicle.

The signal processing device 170 may control overall operation of each device in the display apparatus 100 for vehicles.

Meanwhile, the signal processing device 170 may be implemented in the form of a System On Chip (SOC).

The signal processing device 170 may include a processor 175 performing signal processing for the vehicle displays 180a, 180b, and 180c, a first memory 140a and a second memory 140b storing various data, and a microcomputer 135.

The first memory 140a is a non-volatile memory and may store various types of data even in a standby mode or when power is turned off.

For example, the first memory 140a may store a file corresponding to a first application executed in any one of the plurality of virtual machines 510 to 550 based on entry into the standby mode.

As another example, the first memory 140a may store an operating system (OS).

Meanwhile, the first memory 140a may store various data for overall operation of the display apparatus 100 for vehicles, such as a program for processing or controlling the signal processing device 170.

Meanwhile, the second memory 140b is a volatile memory, from which various types of data may be erased in a standby mode or when power is turned off, and the second memory 140b may temporarily store data in an active mode.

For example, the second memory 140b may load a file stored in the first memory 140a based on the switching from the standby mode to the active mode.

As another example, the second memory 140b may load the operating system OS stored in the first memory 140a based on the switching from the standby mode to the active mode.

Figure 5:
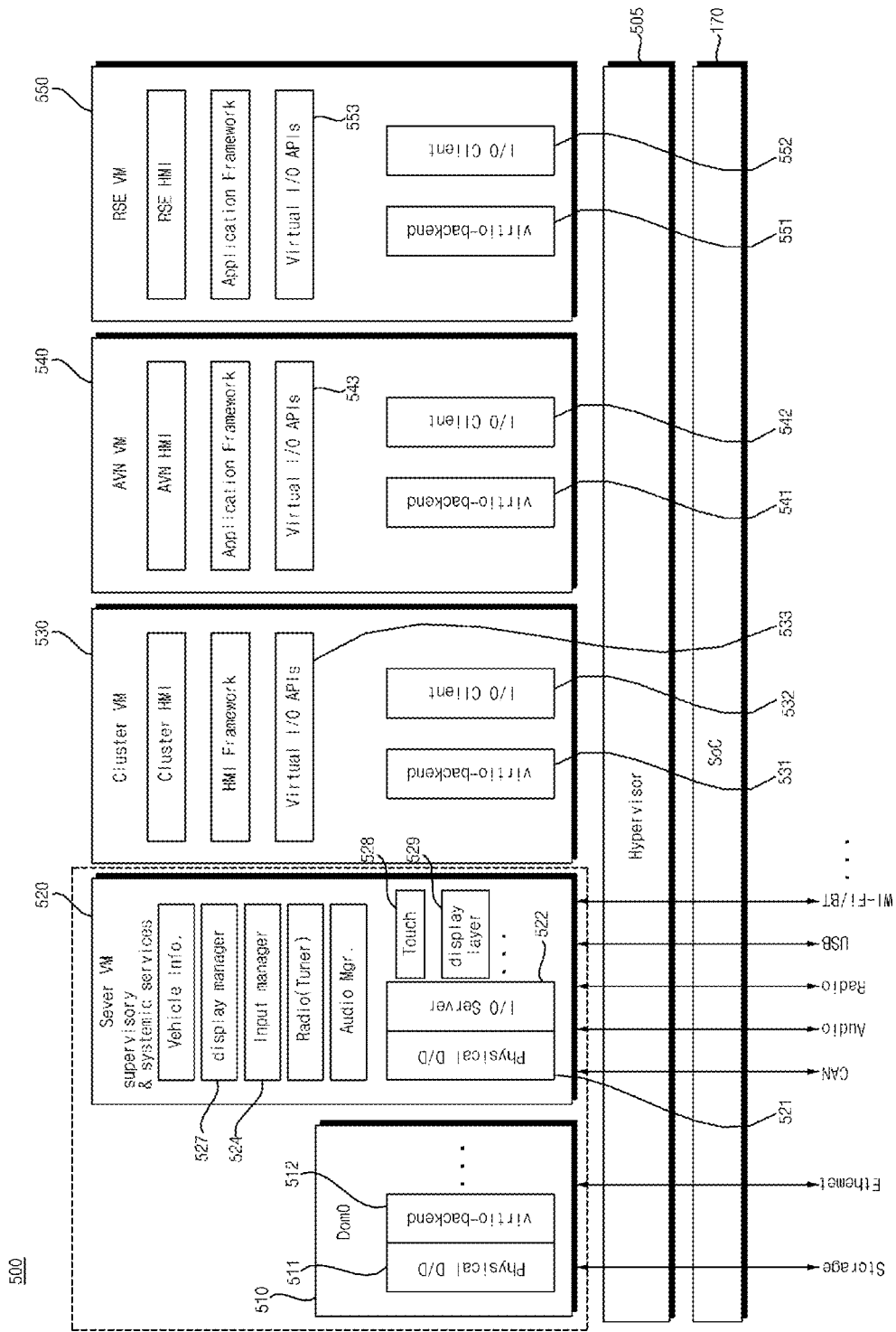
FIG. 5 is a view showing an example of a system executed in a signal processing device according to an embodiment of the present disclosure.

Meanwhile, the processor 175 may execute a hypervisor (505 in FIG. 5).

Meanwhile, the processor 175 may execute the first to fourth virtual machines 520 to 550 on the hypervisor 505 (see FIG. 5) in the processor 175.

Meanwhile, the processor 175 may further execute a legacy virtual machine 510 configured to receive and process Ethernet data. For example, as shown in FIG. 5, the legacy virtual machine 510 may be executed by the first virtual machine 520 in the processor 175.

Among the first to third virtual machines 520 to 550 (see FIG. 5), the first virtual machine 520 may be called a server virtual machine, and the second to fourth virtual machines 530 and 550 may be called guest virtual machines.

The second virtual machine 530 may be operated for the first display 180a, the third virtual machine 540 may be operated for the second display 180b, and the fourth virtual machine 550 may be operated for the third display 180c.

For example, the first virtual machine 520 in the processor 175 may receive, process, and output vehicle sensor data, position information data, camera image data, audio data, or touch input data. Data processed only by a legacy virtual machine and data processed by the first virtual machine 520 may be distinguished from each other, whereby data processing may be efficiently performed. In particular, the first virtual machine 520 may process most of the data, whereby 1:N data sharing can be achieved.

As another example, the first virtual machine 520 may directly receive and process communication data, audio data, radio data, USB data, and wireless communication data for the second to fourth virtual machines 530 to 550.

The first virtual machine 520 may transmit the processed data to the second to fourth virtual machines 530 to 550.

Consequently, only the first virtual machine 520, among the first to third virtual machines 520 to 540, may receive communication data and external input data, and may perform signal processing, whereby load in signal processing by the other virtual machines can be reduced and 1:N data communication can be achieved, and therefore synchronization at the time of data sharing can be achieved.

Meanwhile, the first virtual machine 520 writes some of data in a first shared memory (not shown) so as to be transmitted to the second virtual machine 530, and writes some other of data in the first shared memory (not shown) so as to be transmitted to the third virtual machine 540.

The second virtual machine 530 to the fourth virtual machine 550 are configured to process the received data, and write the processed data in a second shared memory (not shown).

At this time, data may be any one of image data, audio data, navigation data, and voice recognition data.

Meanwhile, the first virtual machine 520 may process some other of data, and may be configured to write the processed data in the second shared memory (not shown). That is, the first virtual machine 520 may perform data processing in addition to the second virtual machine 530 to the fourth virtual machine 550.

Meanwhile, in response to the fourth virtual machine 550 configured to be operated for the third display 180c being executed in the processor 175, the first virtual machine 520 may write some other of data in the first shared memory (not shown), and the fourth virtual machine 550 may process the received data and may be configured to write the processed data in the second shared memory (not shown).

Meanwhile, the first virtual machine 520 may generate command queues for distributed processing of data in the second virtual machine 530 to the fourth virtual machine 550. Consequently, the plurality of virtual machines may divide and process data.

Meanwhile, in response to the second virtual machine 530 to the fourth virtual machine 550 sharing the same data, the first virtual machine 520 in the processor 175 may generate one command queue. Consequently, the same data may be synchronized and shared.

Meanwhile, the first virtual machine 520 may generate command queues corresponding to the number of virtual machines for distributed processing of data.

Meanwhile, the first virtual machine 520 may be configured to transmit at least some of data to at least one of the second virtual machine 530 to the fourth virtual machine 550 for distributed processing of data.

For example, the first virtual machine 520 may allocate the first shared memory (not shown) for transmitting at least some of data to at least one of the second virtual machine 530 to the fourth virtual machine 550, and image data processed by the second virtual machine 530 to the fourth virtual machine 550 may be written in the second shared memory (not shown).

Meanwhile, the first virtual machine 520 may be configured to write data in the shared memory 508, whereby the second virtual machine 530 to the fourth virtual machine 550 share the same data.

For example, the first virtual machine 520 may be configured to write radio data or wireless communication data in the shared memory 508, whereby the second virtual machine 530 to the fourth virtual machine 550 share the same data. Consequently, 1:N data sharing can be achieved.

Eventually, the first virtual machine 520 may process most of the data, whereby 1:N data sharing can be achieved.

Meanwhile, the first virtual machine 520 in the processor 175 may be configured to set the shared memory 508 based on the hypervisor 505 in order to transmit the same data to the second virtual machine 530 to the fourth virtual machine 550.

That is, the first virtual machine 520 in the processor 175 may transmit the same data to the second virtual machine 530 to the fourth virtual machine 550 in a synchronized state using the shared memory 508 based on the hypervisor 505. Consequently, the plurality of displays 180a to 180c in the vehicle may display the same images in a synchronized state.

Meanwhile, the signal processing device 170 may process various signals, such as an audio signal, an image signal, and a data signal.

Figure 4:
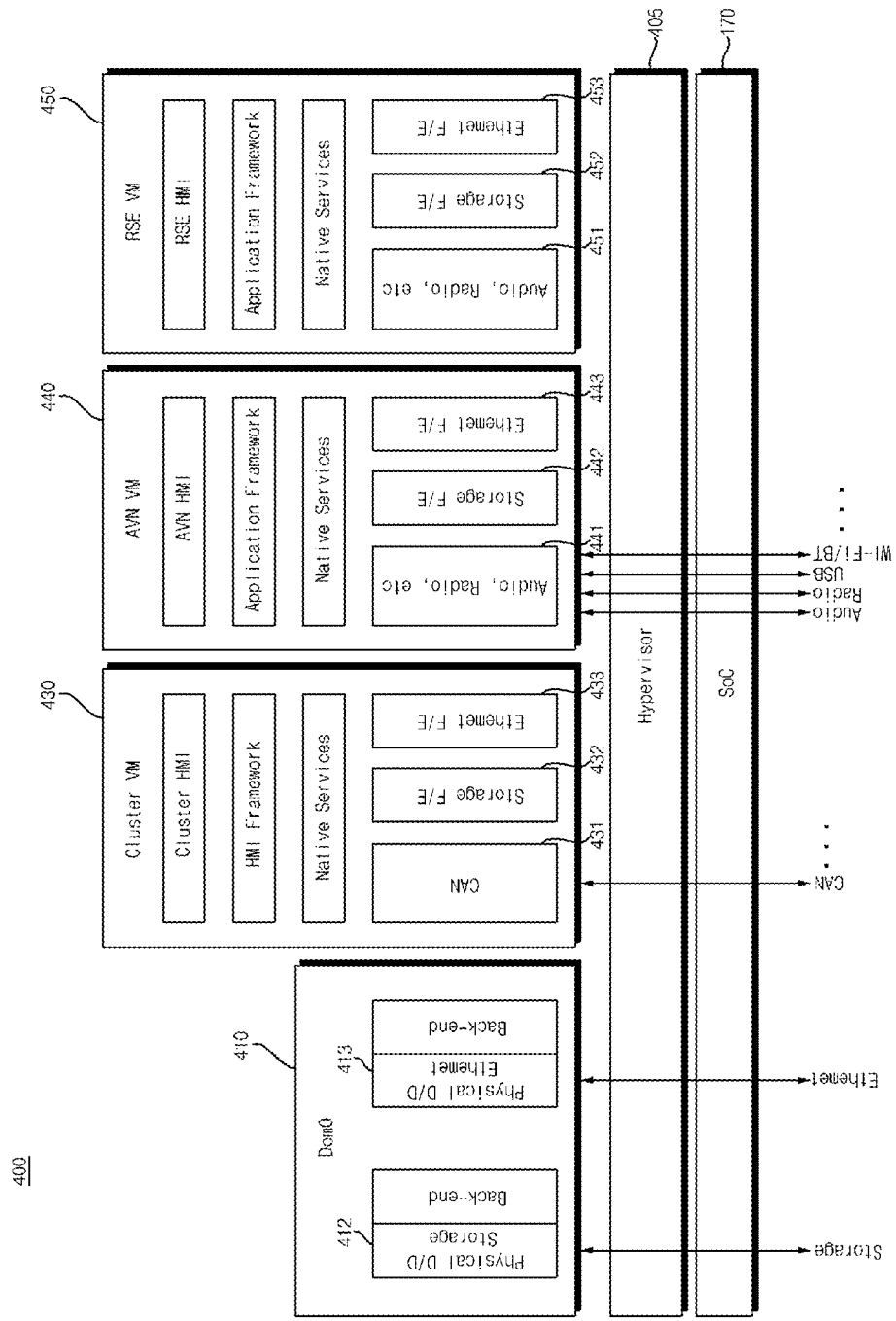
FIG. 4 is a view showing a system executed in a signal processing device related to the present disclosure.

FIG. 4 is a view showing a system executed in a signal processing device related to the present disclosure.

Referring to the figure, FIG. 4 is a view illustrating that virtual machines are used for the cluster display 180a, the AVN display 180b, and the RSE display 180c.

The system 400 executed in the signal processing device of FIG. 4 illustrates that a cluster virtual machine 430, an AVN virtual machine 440, and the RSE virtual machine 450 are executed through a hypervisor 405 in the processor 175.

Meanwhile, the system 400 executed in the signal processing device of FIG. 4 illustrates that a legacy virtual machine 410 is also executed on the hypervisor 405 in the processor 175 in the signal processing device 170.

The legacy virtual machine 410 may include an interface 412 for data communication with the memory 140 and an interface 413 for Ethernet communication.

Meanwhile, the cluster virtual machine 430 may include an interface 431 for communication, an interface 432 for communication with the interface 412 of the legacy virtual machine 410, and an interface 433 for communication with the interface 413 of the legacy virtual machine 410.

Meanwhile, the AVN virtual machine 440 may include an interface 441 for input and output of audio data, radio data, USB data, and wireless communication data, an interface 442 for communication with the interface 412 of the legacy virtual machine 410, and an interface 443 for communication with the interface 413 of the legacy virtual machine 410.

Meanwhile, the RSE virtual machine 450 may include an interface 451 for input and output of audio data, radio data, USB data, and wireless communication data, an interface 452 for communication with the interface 412 of the legacy virtual machine 410, and an interface 453 for communication with the interface 413 of the legacy virtual machine 410.

In the system 400, there is a disadvantage in that communication data are input and output only in the cluster virtual machine 430, whereby the communication data cannot be utilized in the AVN virtual machine 440.

Also, in the system 400 of FIG. 4, there is a disadvantage in that audio data, radio data, USB data, and wireless communication data are input and output only in the AVN virtual machine 440, whereby these data cannot be utilized in the cluster virtual machine 430.

Meanwhile, there is a disadvantage in that the cluster virtual machine 430, the cluster virtual machine 440, and the cluster virtual machine 450 must include the interfaces 431 and 432, the interfaces 441 and 442, and the interfaces 451 and 452, respectively, for memory data and Ethernet communication data input and output in the legacy virtual machine 410.

Therefore, the present disclosure proposes a scheme for improving the system of FIG. 4. That is, unlike FIG. 4, virtual machines are classified into a server virtual machine and guest virtual machines for inputting and outputting various memory data and communication data not in the guest virtual machines but in the server virtual machine. This will be described with reference to FIG. 5 and subsequent figures.

FIG. 5 is a view showing an example of a system executed in a signal processing device according to an embodiment of the present disclosure.

Referring to the figure, the system 500 of FIG. 5 illustrates that the first virtual machine 520, which is a server virtual machine, the second virtual machine 530, which is a guest virtual machine, the third virtual machine 540, which is a guest virtual machine, and the fourth virtual machine 550, which is a guest virtual machine, are executed on the hypervisor 505 in the processor 175 of the signal processing device 170.

The second virtual machine 530 may be a virtual machine for the cluster display 180a, the third virtual machine 540 may be a virtual machine for the AVN display 180b, and the fourth virtual machine 550 may be a virtual machine for the RSE display 180c.

That is, the second virtual machine 530, the third virtual machine 540, and the fourth virtual machine 550 may be operated for image rendering of the cluster display 180a, the AVN display 180b, and the RSE display 180c, respectively.

Meanwhile, the system 50 executed in the signal processing device 170 of FIG. 5 illustrates that a legacy virtual machine 510 is also executed on the hypervisor 505 in the processor 175 in the signal processing device 170.

The legacy virtual machine 510 may include an interface 511 for data communication with the memory 140 and Ethernet communication.

The figure illustrates that the interface 511 is a physical device driver; however, various modifications are possible.

Meanwhile, the legacy virtual machine 510 may further include a virtio-backend interface 512 for data communication with the second to fourth virtual machines 530 to 550.

The first virtual machine 520 may include an interface 521 for input and output of audio data, radio data, USB data, and wireless communication data and an input and output server interface 522 for data communication with the guest virtual machines.

That is, the first virtual machine 520, which is a server virtual machine, may provide inputs/outputs (I/O) difficult to virtualize with standard virtualization technology (VirtIO) to a plurality of guest virtual machines, such as the second to fourth virtual machines 530 to 550.

Meanwhile, the first virtual machine 520, which is a server virtual machine, may control radio data and audio data at a supervisor level, and may provide the data to a plurality of guest virtual machines, such as the second to fourth virtual machines 530 to 550.

Meanwhile, the first virtual machine 520, which is a server virtual machine, may process vehicle data, sensor data, and surroundings-of-vehicle information, and may provide the processed data or information to a plurality of guest virtual machines, such as the second to fourth virtual machines 530 to 550.

Meanwhile, the first virtual machine 520 may provide supervisory services, such as processing of vehicle data and audio routing management.

Next, the second virtual machine 530 may include an input and output client interface 532 for data communication with the first virtual machine 520 and APIs 533 configured to control the input and output client interface 532.

In addition, the second virtual machine 530 may include a virtio-backend interface for data communication with the legacy virtual machine 510.

The second virtual machine 530 may receive memory data by communication with the memory 140 or Ethernet data by Ethernet communication from the virtio-backend interface 512 of the legacy virtual machine 510 through the virtio-backend interface.

Next, the third virtual machine 540 may include an input and output client interface 542 for data communication with the first virtual machine 520 and APIs 543 configured to control the input and output client interface 542.

In addition, the third virtual machine 540 may include a virtio-backend interface for data communication with the legacy virtual machine 510.

The third virtual machine 540 may receive memory data by communication with the memories 140a and 140b or Ethernet data by Ethernet communication from the virtio-backend interface 512 of the legacy virtual machine 510 through the virtio-backend interface.

Next, the fourth virtual machine 550 may include an input/output client interface 552 for data communication with the first virtual machine 520 and APIs 553 controlling the input/output client interface 552.

In addition, the fourth virtual machine 550 may include a virtio-backend interface for data communication with the legacy virtual machine 510.

The fourth virtual machine 550 may receive memory data by communication with the memories 140a and 140b or Ethernet data by Ethernet communication from the virtio-backend interface 512 of the legacy virtual machine 510 through the virtio-backend interface.

Meanwhile, the legacy virtual machine 510 may be provided in the first virtual machine 520, unlike FIG. 5.

In the system 500, communication data are input and output only in the first virtual machine 520, but may be provided to a plurality of guest virtual machines, such as the second to fourth virtual machines 530 to 550, through data processing in the first virtual machine 520. Consequently, 1:N data communication by processing of the first virtual machine 520 can be achieved.

Also, in the system 500 of FIG. 5, audio data, radio data, USB data, and wireless communication data are input and output only in the first virtual machine 520, but may be provided to a plurality of guest virtual machines, such as the second to fourth virtual machines 530 to 550, through data processing in the first virtual machine 520. Consequently, 1:N data communication by processing of the first virtual machine 520 can be achieved.

Also, in the system 500 of FIG. 5, touch input to the first display 180a or the second display 180b is input only to the first virtual machine 520 and is not input to the second virtual machine 530 to the fourth virtual machine 550. Information regarding the touch input is transmitted to the second virtual machine 530 or the third virtual machine 540.

For example, the first virtual machine 520 in the processor 175 may receive a touch input for the first display 180a or the second display 180b, and transmit information on the touch input to the second virtual machine 530 or the third virtual machine 540.

Consequently, the touch input can be rapidly and accurately processed. In addition, the touch input can be rapidly and accurately processed even though the number of virtual machines that are executed is increased.

Meanwhile, in the system 500 of FIG. 5, the second to fourth virtual machines 530 to 550 may be operated based on different operating systems.

For example, the second virtual machine 530 may be operated based on a Linux OS, the third virtual machine 540 may be operated based on a Web OS, and the fourth virtual machine 550 may be operated based on Android or Windows OS.

The shared memory 508 based on the hypervisor 505 may be set for data sharing, even though the first virtual machine and the second to fourth virtual machines 530 to 550 are operated based on different operating systems.

Consequently, even though the second to fourth virtual machines 530 to 550 are operated based on different operating systems, the same data or the same images may be shared in a synchronized state. Eventually, the plurality of displays 180a to 180c may display the same data or the same images in a synchronized state.

Meanwhile, the first virtual machine 520 transmits information regarding the touch input to the second virtual machine 530 or the third virtual machine 540 even though the second to fourth virtual machines 530 to 550 are operated based on different operating systems. Consequently, the touch input can be rapidly and accurately processed even though the second to fourth virtual machines 530 to 550 are operated based on different operating systems (OS).

Meanwhile, the first virtual machine 520 may be configured to store the coordinate information of a touch input in the shared memory 508. Accordingly, it is possible to quickly and accurately process the touch input.

Meanwhile, the first virtual machine 520 may transmit a buffer index for the shared memory 508 to the second virtual machine 530 or the third virtual machines 540, and the second virtual machine 530 or the third virtual machine 540 may read coordinate information of the touch input recorded in the shared memory 508 based on the received buffer index. Consequently, it is possible to quickly and accurately process the touch input.

Meanwhile, the first virtual machine 520 may include a display manager 527 configured to control an overlay displayed on the first display 180a and the second display 180b through the second to fourth virtual machines 530 to 550 and a display layer server 529.

The display layer server 529 may receive a first overlay provided by the second virtual machine 530 and a second overlay provided by the third virtual machine 540.

Meanwhile, the display layer server 529 may transmit a virtual overlay, which is different from the first overlay or the second overlay, to at least one of the second virtual machine 530 to the fourth virtual machine 550.

Meanwhile, the display manager 527 in the first virtual machine 520 may receive the first overlay provided by the second virtual machine 530, the second overlay provided by the third virtual machine 540, and the third overlay provided by the fourth virtual machine 550 through the display layer server 529.

The display manager 527 in the first virtual machine 520 may be configured to transmit the virtual overlay, which is different from the first overlay, the second overlay, or the third overlay, to at least one of the second virtual machine 530 to the fourth virtual machine 550 through the display layer server 529.

In response thereto, the second virtual machine 530 may be configured to combine and display the first overlay and the virtual overlay on the first display 180a.

In addition, the third virtual machine 540 may be configured to combine and display the second overlay and the virtual overlay on the second display 180*b*.

In addition, the fourth virtual machine 550 may synthesize the third overlay and the virtual overlay and control them to be displayed on the third display 180*c*.

Meanwhile, the first virtual machine 520 may include an input manager 524 configured to receive an input signal from the outside. At this time, the input signal may be an input signal from a predetermined button (start button) in the vehicle, a touch input signal, or a voice input signal.

For example, the input manager 524 in the first virtual machine 520 may receive touch input from the first display 180*a*, the second display 180*b*, or the third display 180*c*.

Meanwhile, the first virtual machine 520 may include a touch server 528 configured to transmit information regarding the touch input related to the touch input from the first display 180*a*, the second display 180*b*, or the third display 180*c* to the second virtual machine 530, the third virtual machine 540, or the fourth virtual machine 550.

For example, in response to touch input corresponding to the first display 180*a*, the touch server 528 in the first virtual machine 520 may transmit information regarding the touch input to the second virtual machine 530.

Meanwhile, the touch server 528 in the first virtual machine 520 may receive the touch input from the first display 180*a*, the second display 180*b*, or the third display 180*c*.

Figure 6:
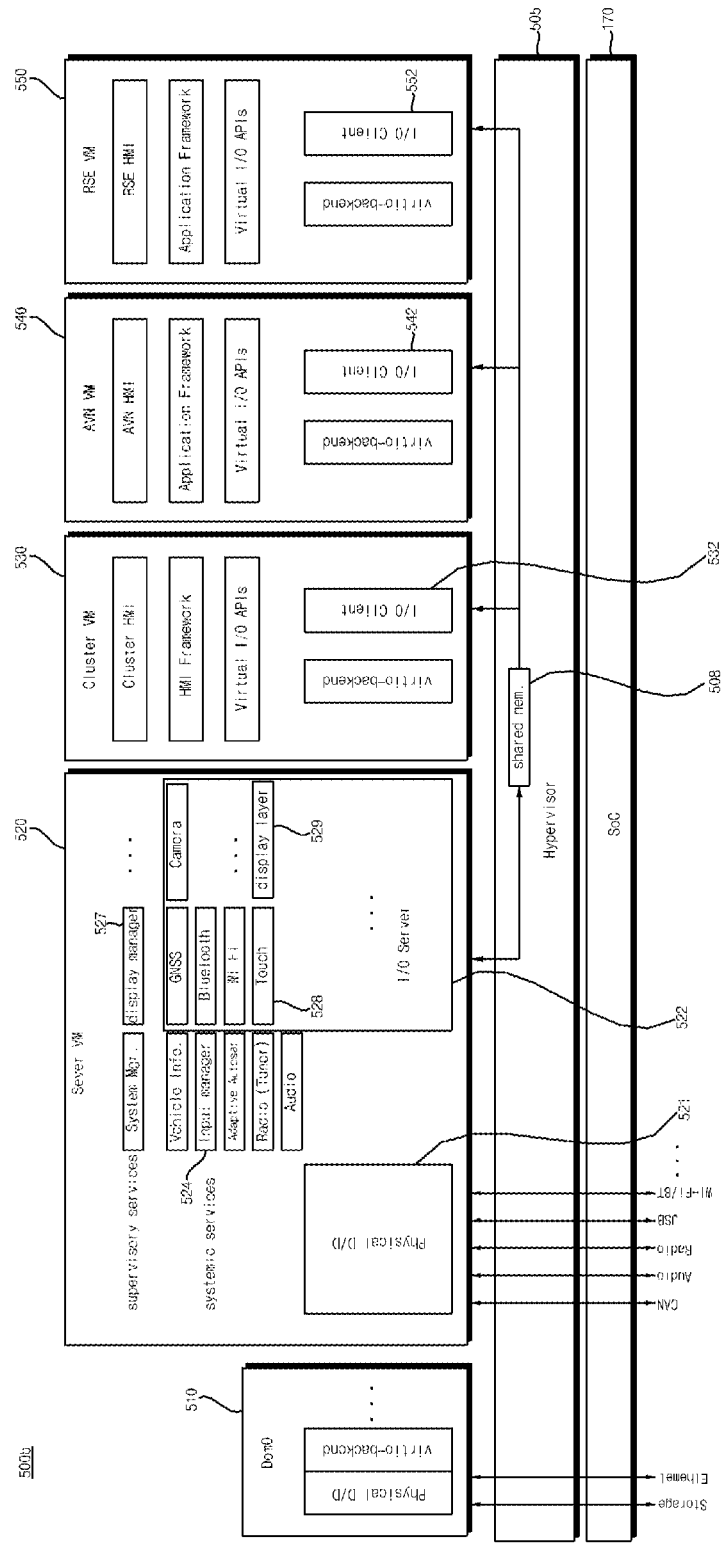
FIG. 6 is a view showing another example of the system executed in the signal processing device according to the embodiment of the present disclosure.

FIG. 6 is a view showing another example of the system executed in the signal processing device according to the embodiment of the present disclosure.

Referring to the figure, in the system 500*b* executed by the processor 175 in the signal processing device 170, the processor 175 in the signal processing device 170 executes the first to fourth virtual machines 520 to 550 on the hypervisor 505 in the processor 175, and the first virtual machine 520 in the processor 175 is configured to set the shared memory 508 based on the hypervisor 505 for transmission of data to the second virtual machine 530, the third virtual machine 540, and the fourth virtual machine 550.

For example, information regarding touch input may be illustrated as the data. Consequently, the information regarding touch input may be transmitted to the second virtual machine 530, the third virtual machine 540, or the fourth virtual machine 550. Eventually, the touch input to the first display 180*a*, the second display 180*b*, or the third display 180*c* can be rapidly and accurately processed. In addition, the touch input can be rapidly and accurately processed even though the number of virtual machines that are executed is increased.

As another example, image data may be illustrated as the data. Consequently, an image may be displayed on the first display 180*a*, the second display 180*b*, or the third display 180*c*.

Meanwhile, in response to the same image data being shared in the shared memory 508, the plurality of displays 180*a* to 180*c* in the vehicle may display the same data in a synchronized state.

As another example, may communication data, audio data, radio data, USB data, wireless communication data, or position information data may be illustrated as the data. Consequently, information regarding the data may be displayed on the first display 180*a*, the second display 180*b*, or the third display 180*c*.

Meanwhile, although not shown in FIG. 6, the legacy virtual machine 510 may transmit memory data from the memory 140 or Ethernet data by Ethernet communication to the second virtual machine 530, the third virtual machine 540, and the fourth virtual machine 550 using the shared memory 508 based on the hypervisor 505. Consequently, information corresponding to the memory data or the Ethernet data may be displayed on the first display 180*a*, the second display 180*b*, or the third display 180*c*.

Meanwhile, the first virtual machine 520 in the system 500*b* of FIG. 6 may include a display manager 527, a display layer server 529, an input manager 524, and a touch server 528, similarly to the first virtual machine 520 in the system 500 of FIG. 5.

Meanwhile, the input and output server interface 522 in the first virtual machine 520 in the system 500*b* of FIG. 6 may include a display layer server 529 and a touch server 528, unlike FIG. 5.

The operation of the display manager 527, the display layer server 529, the input manager 524, and the touch server 528 is the same to FIG. 5, and therefore a description thereof will be omitted.

Meanwhile, the first virtual machine 520 of FIG. 6 may further include a system manager for overall system control, a vehicle information manager for vehicle information management, an audio manager for audio control, and a radio manager for radio control.

Meanwhile, the input and output server interface 522 in the first virtual machine 520 in the system 500*b* of FIG. 6 may further include a GNSS server for GPS information input and output, a Bluetooth server for Bluetooth input and output, a Wi-Fi server for Wi-Fi input and output, and a camera server for camera data input and output.

Figure 7:
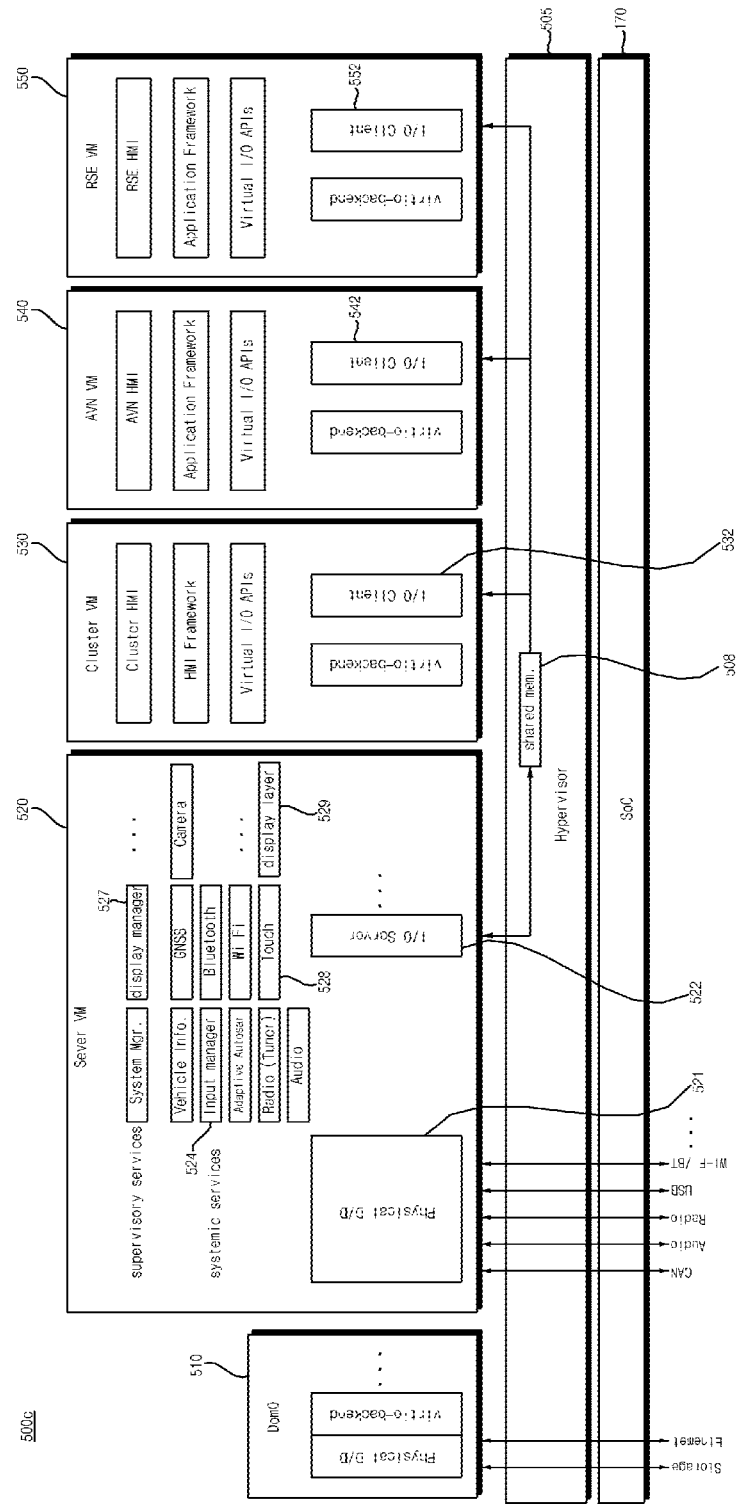
FIG. 7 is a view showing a further example of the system executed in the signal processing device according to the embodiment of the present disclosure.

FIG. 7 is a view showing a further example of the system executed in the signal processing device according to the embodiment of the present disclosure.

Referring to the figure, the system 500*c* executed by the processor 175 in the signal processing device of FIG. 7 is similar to the system 500*b* of FIG. 6.

That is, like FIG. 6, the processor 175 of FIG. 7 executes the first to fourth virtual machines 520 to 550 on the hypervisor 505 in the processor 175.

In FIG. 7, however, the display layer server 529 and the touch server 528 may be provided and executed in the first virtual machine 520 outside the input and output server interface 522, unlike FIG. 6.

In addition, the GNSS server for GPS information input and output, the Bluetooth server for Bluetooth input and output, the Wi-Fi server for Wi-Fi input and output, and the camera server for camera data input and output may be provided and executed in the first virtual machine 520 outside the input and output server interface 522, unlike FIG. 6.

That is, the display manager 527, the display layer server 529, the input manager 524, and the touch server 528 may be provided and executed in the first virtual machine 520.

Meanwhile, the input and output server interface 522 in the first virtual machine 520 in the system 500*b* of FIG. 6 may include a display layer server 529 and a touch server 528, unlike FIG. 5.

The operation of the display manager 527, the display layer server 529, the input manager 524, and the touch server 528 is the same to FIG. 5, and therefore a description thereof will be omitted.

Figure 8:
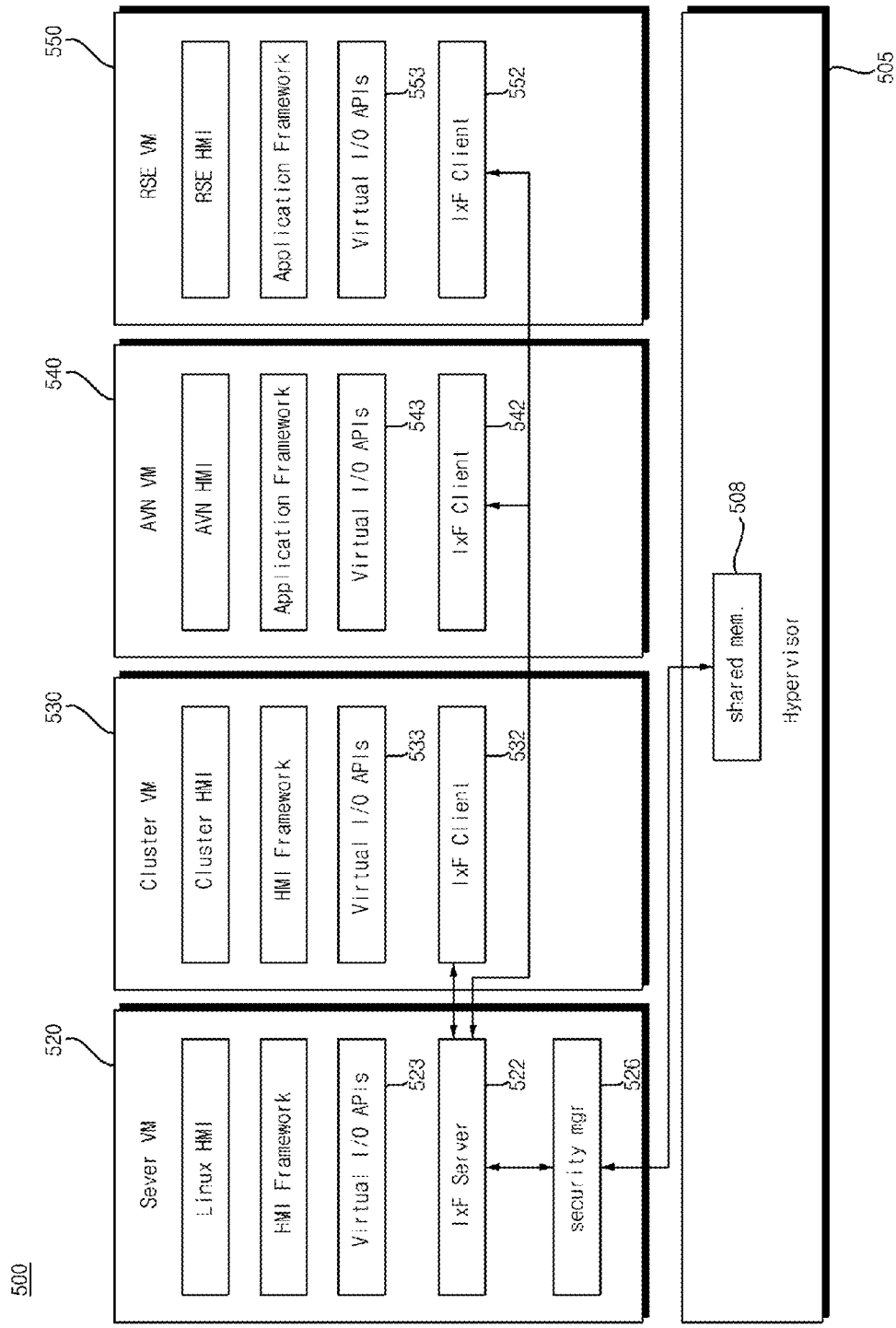
FIGS. 8 to 9B are views referred to in the description of FIG. 5.
Figure 9A:
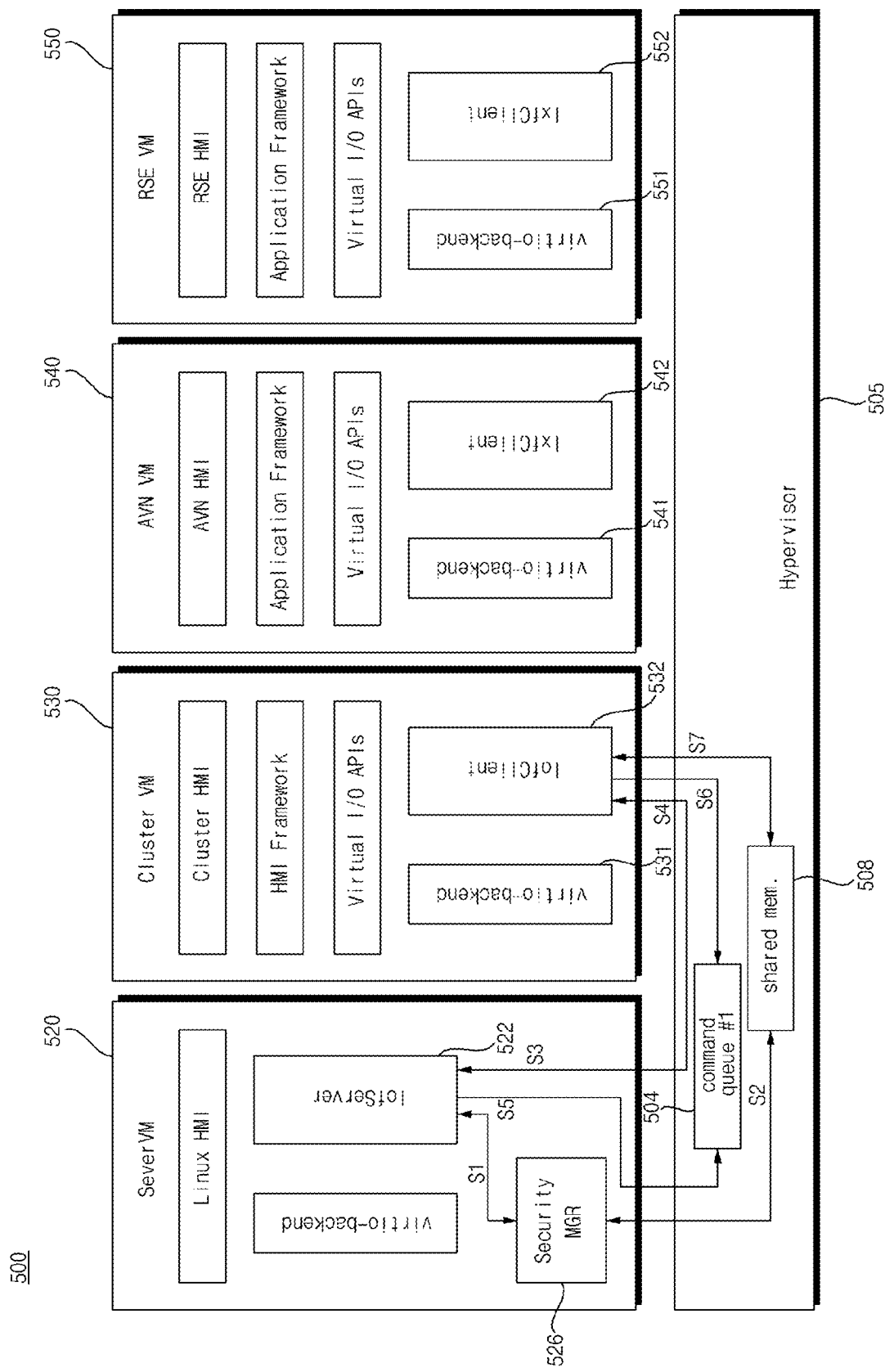
Figure 9B:
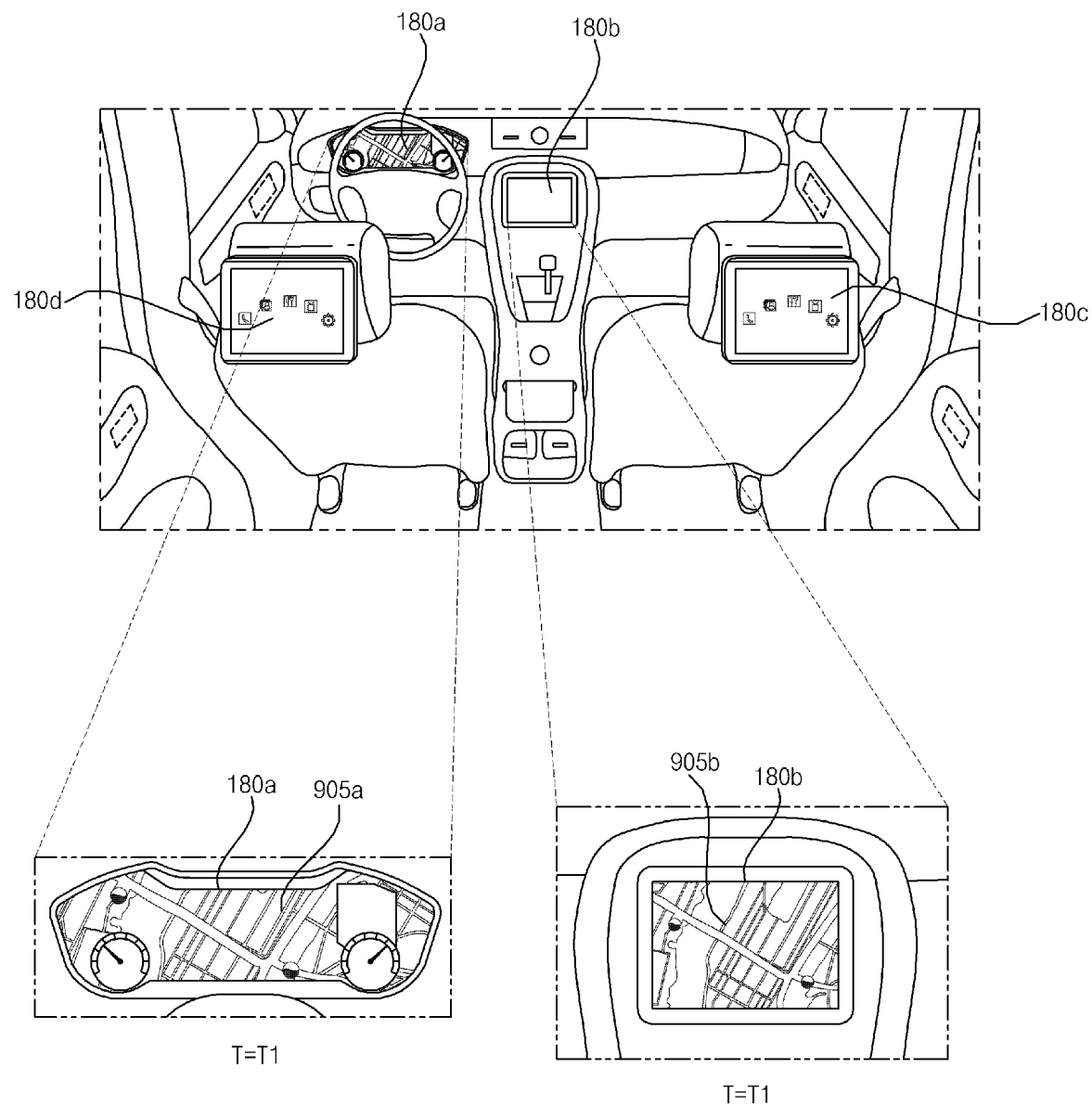

FIGS. 8 to 9B are views referred to in the description of FIG. 5.

First, FIG. 8 illustrates that the first to fourth virtual machines 520 to 550 are executed on the hypervisor 505 in the processor 175 of the system 500 according to the present disclosure and that the first virtual machine 520 in the processor 175 is configured to set the shared memory 508 based on the hypervisor 505 in order to transmit the same data to the second virtual machine 530, the third virtual machine 540, and the fourth virtual machine 550.

Consequently, the plurality of displays 180a to 180c in the vehicle may display the same images in a synchronized state.

Meanwhile, high-speed data communication may be performed between the plurality of virtual machines. Furthermore, high-speed data communication may be performed even though the plurality of virtual machines is executed by different operating systems.

Meanwhile, the first virtual machine 520 in the processor 175 may not allocate memories corresponding in number to the virtual machines but may use a single shared memory 508, not memory allocation in response to transmitting the data processed by the first virtual machine 520 to another virtual machine. Consequently, 1:N data communication using the shared memory 508, not 1:1 data communication, may be performed between the virtual machines.

Meanwhile, the first virtual machine 520 in the processor 175 may include an input and output server interface 522 and a security manager 526.

Meanwhile, the second virtual machine 530, the third virtual machine 540, and the fourth virtual machine 550 may include input and output client interfaces 532, 542, and 552, respectively. Consequently, high-speed data communication between the plurality of virtual machines may be performed using the input and output server interface 522 and the input and output client interfaces 532, 542 and 552.

The input and output server interface 522 in the first virtual machine 520 may receive requests for transmission of the same data from the input and output client interfaces 532, 542, and 552 in the second virtual machine 530, the third virtual machine 540, and the fourth virtual machine 550, and may transmit shared data to the shared memory 508 through the security manager 526 based thereon.

Meanwhile, the input/output server interface 522 in the first virtual machine 520 may control the coordinate information of the touch input to be stored in the shared memory 508, and the input/output client interfaces 532, 542, and 552 in the second virtual machine 530 or the third virtual machine 540, or the fourth virtual machine 550 may read coordinate information of the touch input recorded in the shared memory 508. Consequently, it is possible to quickly and accurately process the touch input.

FIG. 9A is a view illustrating transmission of shared data in more detail.

Referring to the figure, in order to transmit shared data, the input and output server interface 522 in the first virtual machine 520 transmits a request for allocation of the shared memory 508 to the security manager 526 (S1).

Subsequently, the security manager 526 may allocate the shared memory 508 using the hypervisor 505 (S2), and may write shared data in the shared memory 508.

Meanwhile, the input and output client interfaces 532, 542, and 552 may transmit a request for connection to the input and output server interface 522 after allocation of the shared memory 508 (S3).

Meanwhile, the input and output server interface 522 transmits information regarding the shared memory 508 including key data to the input and output client interfaces 532, 542, and 552 after allocation of the shared memory 508 (S4). At this time, the key data may be private key data for data access.

Meanwhile, the first virtual machine 520 in the processor 175 may transmit information regarding the shared memory 508 to the second virtual machine 530, the third virtual machine 540, and the fourth virtual machine 550 after setting of the shared memory 508.

Subsequently, the input and output server interface 522 in the first virtual machine 520 is configured to generate a command or a command queue for event processing, other than data, to control distributed processing between the virtual machines (S5).

The figure illustrates that a command queue is generated in a command queue buffer 504 in the hypervisor 505 under control of the input and output server interface 522. However, the present disclosure is not limited thereto, and the command queue may be generated in the first virtual machine 520, not the hypervisor 505, under control of the input and output server interface 522.

Subsequently, the input and output client interfaces 532, 542, and 552 access the command queue buffer 504 to receive the generated command queue or information regarding the command queue (S6).

For example, in response to the commands transmitted to the input and output client interfaces 532, 542, and 552 being the same, the generated command queues may be the same.

As another example, in response to the commands transmitted to the input and output client interfaces 532, 542, and 552 being different from each other, different command queues may be transmitted to the input and output client interfaces 532, 542, and 552.

Subsequently, the input and output client interfaces 532, 542, and 552 may access the shared memory 508 based on the received key data (S5), and may copy or read the shared data from the shared memory 508 (S7).

Particularly, in response to the input and output client interfaces 532, 542, and 552 receiving the same shared data, the input and output client interfaces 532, 542, and 552 may access the shared memory 508 based on the same command queues and the same key data (S5), and may copy or read the shared data from the shared memory 508.

Consequently, the second virtual machine 530, the third virtual machine 540, and the fourth virtual machine 550 may access the shared memory 508, and may eventually share the shared data.

For example, in the case in which the shared data are image data, the second virtual machine 530, the third virtual machine 540, and the fourth virtual machine 550 may share the image data, and eventually the plurality of displays 180a to 180c in the vehicle may display the same shared images in a synchronized state.

FIG. 9B illustrates that, by the system 500 of FIG. 9A, the second virtual machine 530 displays image data received through the shared memory 508 on the first display 180a, and the third virtual machine 540 displays image data received through the shared memory 508 on the second display 180b.

FIG. 9B illustrates that an image 905a displayed on the first display 180a and an image 905b displayed on the second display 180b are synchronized, whereby the same images 905a and 905b are displayed at the time of T1.

That is, image data processed by the first virtual machine 520 in the processor 175 are transmitted to the second virtual machine 530 to the fourth virtual machine 550 through the shared memory 508, and the first image 905a displayed on the first display 180a and the second image 905b displayed on the second display 180b based on the image data may be the same. Consequently, the plurality of displays 180a to 180c in the vehicle may display the same images in a synchronized state.

FIG. 10 is a flowchart illustrating an operating method of a signal processing device related to the present disclosure.

Referring to the figure, when the standby mode is switched to the active mode, power of the microcomputer 135 in the signal processing device 170 may be turned on (S1010).

Then, the processor 175 in the signal processing device 170 may turn on the hypervisor 505 to execute (S1020).

Next, the processor 175 in the signal processing device 170 may turn on a plurality of virtual machines on the hypervisor 505 (S1030).

For example, the processor 175 in the signal processing device 170 may turn on the plurality of virtual machines 510 to 550 of FIG. 5.

Thereafter, the second memory 140b in the signal processing device 170 may read and load the operating system file stored in the first memory 140a (S1040).

The operating system file at this time may be one file as an image file.

Then, the processor 175 in the signal processing device 170 may start a service process such as application execution using the operating system file loaded in the second memory 140b (S1050).

As shown in FIG. 10, in the case of switching from the standby mode or a hibernation mode to the active mode, a booting period or a wakeup period until an application may be executed takes a considerable amount of time.

In particular, when the plurality of virtual machines 510 to 550 are turned on, the booting period or the wakeup period may further increase as the number of virtual machines 510 to 550 increases.

Accordingly, the present disclosure proposes a method of shortening the booting period or the wakeup period. In particular, a method of shortening the booting period or wakeup period of an important application, virtual machine, or operating system by varying the booting period or wakeup period for each application, virtual machine, or operating system is proposed. This will be described with reference to FIG. 11A.

Figure 11A:
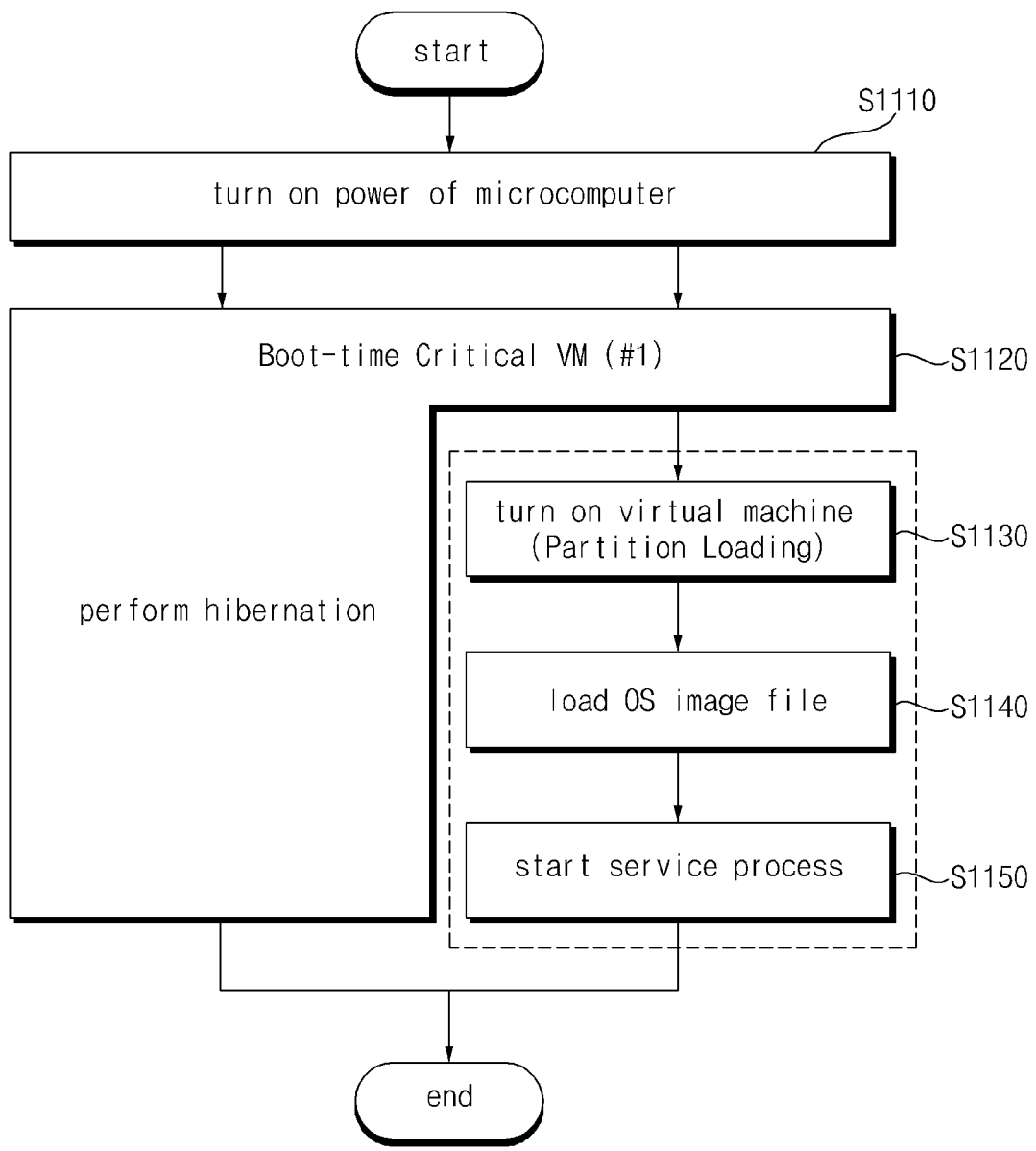
FIG. 11A is a flowchart illustrating an operating method of a signal processing device according to an embodiment of the present disclosure.

FIG. 11A is a flowchart illustrating an operating method of a signal processing device according to an embodiment of the present disclosure.

Referring to the figure, when the standby mode is switched to the active mode, the power of the microcomputer 135 in the signal processing device 170 may be turned on (S1110).

Meanwhile, before switching from the standby mode to the active mode, upon entering the standby mode, the first memory 140a may store a file corresponding to a first application executed in any one of the plurality of virtual machines 510 to 550.

Meanwhile, before switching from the standby mode to the active mode, upon entering the standby mode, a second application executed in another one of the plurality of virtual machines 510 to 550 may be terminated without a separate storage operation.

For example, the first application may include any one of a system check application, a cluster application, or a rear camera application, as an important application, and the second application may include any one of a home screen application or a media playback application, as a normal application.

As another example, the first application, as an important application, may be an application that operates based on a first operating system, and the second application, as a normal application, may be an application that operates based on a second operating system different from the first operating system.

As another example, the first application may be an application that is executed in the server virtual machine 520 among the plurality of virtual machines 510 to 550, and the second application may be an application that is executed in at least one of guest virtual machines 530 to 550, among the plurality of virtual machines 510 to 550.

As another example, the first application may be an application that is executed in the first guest virtual machine 530, among the plurality of virtual machines 510 to 550, and the second application may be an application executed in the second guest virtual machine 540, among the plurality of virtual machines 510 to 550.

Meanwhile, in the standby mode, the first memory 140a may maintain power only in a region for storing files and turns off power in the remaining regions. Accordingly, in the standby mode, standby power consumption can be reduced.

Meanwhile, the first memory 140a may further store an image file including an operating system, and a region storing an image file including an operating system may be powered off in the standby mode. Accordingly, in the standby mode, standby power consumption can be reduced.

Meanwhile, it is preferable that the file stored in the first memory 140a in the standby mode is one file. Accordingly, rapid storage is possible.

In particular, it is preferable that the file stored in the first memory 140a in the standby mode is one image file. Accordingly, rapid storage is possible.

Meanwhile, the virtual machine in which the first application is executed may perform the hibernation mode (S1120).

According to the hibernation mode, the processor 175 may control the first application to be restored based on the file loaded in the second memory 140b based on the switching from the standby mode to the active mode.

Accordingly, a booting period or a wakeup period of the first application running in the vehicle can be shortened. In addition, standby power consumption can be reduced by varying a booting period or a wakeup period by classifying applications.

Meanwhile, the virtual machine in which the first application is executed may control the rest of the virtual machines to perform a normal booting mode.

Accordingly, the virtual machines other than the virtual machine in which the first application may be executed are turned on (S1130).

For example, the virtual machine in which the second application was terminated may be turned on.

Then, the second memory 140b in the signal processing device 170 may read and load the operating system file stored in the first memory 140a (S1140).

The operating system file here may be one file as an image file.

Then, the processor 175 in the signal processing device 170 may start a service process such as execution of the second application by using the operating system file loaded in the second memory 140b (S1150).

Meanwhile, the processor 175 may be configured to display a first image corresponding to the first application by restoring the first application at a first time point, based on the switching from the standby mode to the active mode, and control to display a second image indicating being loaded in response to non-execution of the second application.

Meanwhile, based on the switching from the standby mode to the active mode, the processor 175 may be configured to continuously display the first image at a second time point after the first time point and may be configured to display a third image corresponding to execution of the second application. In this manner, by varying the booting period or the wakeup period by classifying applications, standby power consumption can be reduced.

In this manner, standby power consumption can be reduced by distinguishing the first application from the second application and changing the booting period or the wakeup period.

Similarly, by varying the booting period or the wakeup period by classifying a virtual machine in which the first application is executed and a virtual machine in which the second application is executed, standby power consumption can be reduced.

Meanwhile, the processor 175 may terminate the second application running in the other one of the plurality of virtual machines 510 to 550 based on the entry into the standby mode, turn on the other virtual machine based on the switching from the standby mode to the active mode, and may control the second application to be executed after the operating system is executed based on loading of an image file stored in the first memory 140a from the second memory 140b. Accordingly, the booting period or wakeup period of some applications running in the vehicle can be shortened. In addition, standby power consumption can be reduced by varying the booting period or the wakeup period by classifying applications.

Meanwhile, the processor 175 may turn on the hypervisor 505 after the microcomputer 135 is powered on based on the switching from the standby mode to the active mode, may turn on another virtual machine after the hypervisor 505 is turned on, and may control the second application to be executed after the operating system is executed according to the loading of the image file stored in the first memory 140a from the second memory 140b. Accordingly, the booting period or wakeup period of some applications running in the vehicle can be shortened. In addition, standby power consumption can be reduced by varying the booting period or the wakeup period by classifying applications.

Figure 11B:
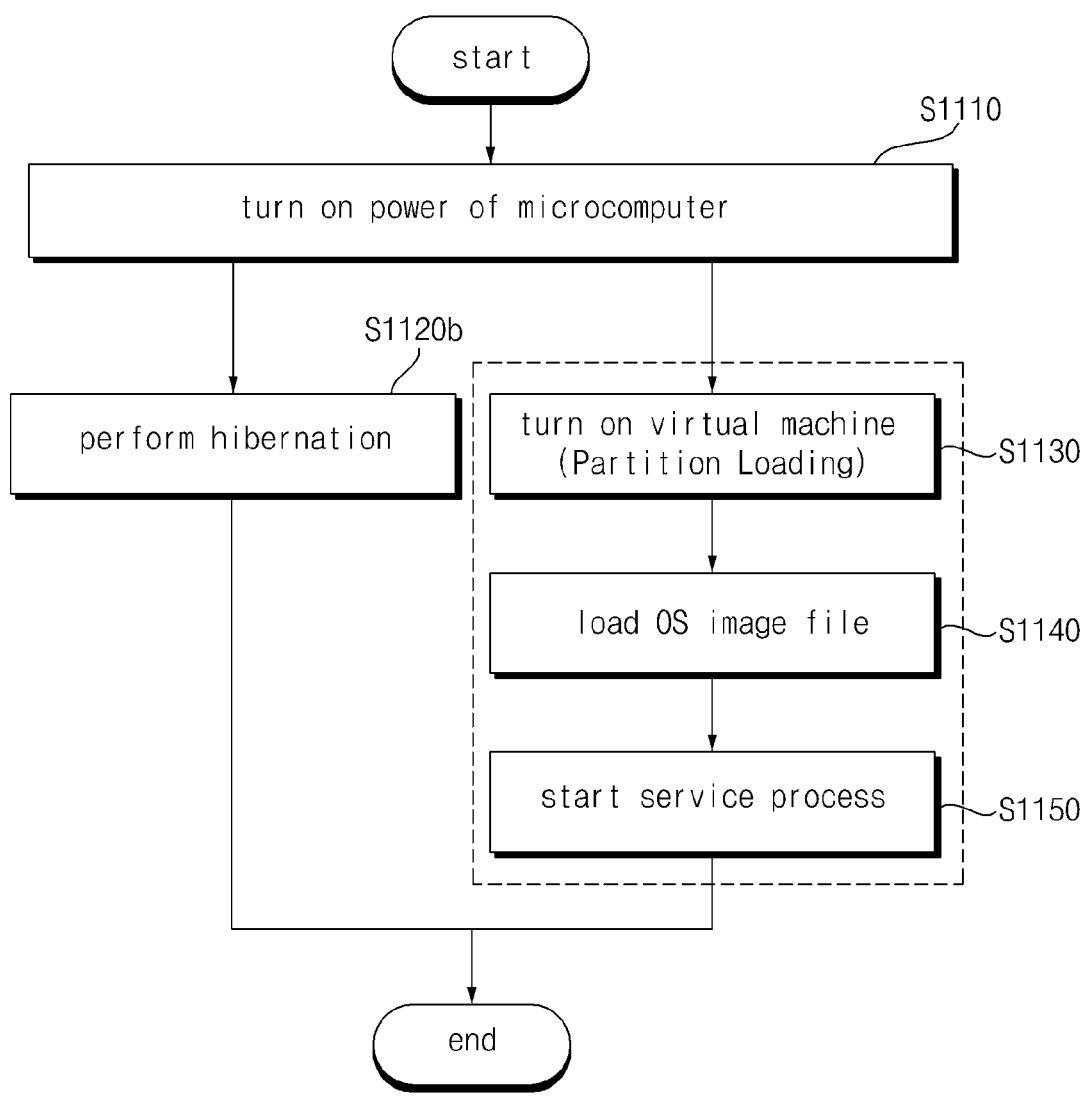
FIG. 11B is a flowchart illustrating an operating method of a signal processing device according to another embodiment of the present disclosure.

FIG. 11B is a flowchart illustrating an operating method of a signal processing device according to another embodiment of the present disclosure.

The flowchart of FIG. 11B is similar to the flowchart of FIG. 11A, but different in that the virtual machine for executing the first application and the virtual machine for executing the second application are performed independently and in parallel after power of the microcomputer is turned on.

Specifically, the virtual machine in which the first application is executed controls not to perform the normal boot mode in the other virtual machines, and the virtual machine for executing the second application may perform different booting modes independently and in parallel.

Accordingly, the virtual machine in which the first application is executed performs the hibernation mode.

That is, the processor 175 may control the first application to be restored based on the file loaded in the second memory 140b based on the switching from the standby mode to the active mode.

Accordingly, the booting period or the wakeup period of the first application running in the vehicle can be shortened. In addition, standby power consumption can be reduced by varying the booting period or the wakeup period by classifying applications.

Meanwhile, the virtual machine in which the second application is executed may control a normal booting mode to be performed.

Accordingly, operations S1130 to S1150 described in FIG. 11A may be performed as they are.

In this manner, by varying the booting period or the wakeup period by classifying applications, standby power consumption can be reduced.

FIGS. 11C to 15B are views referred to in the description of FIG. 11A or 11B.

Figure 11C:
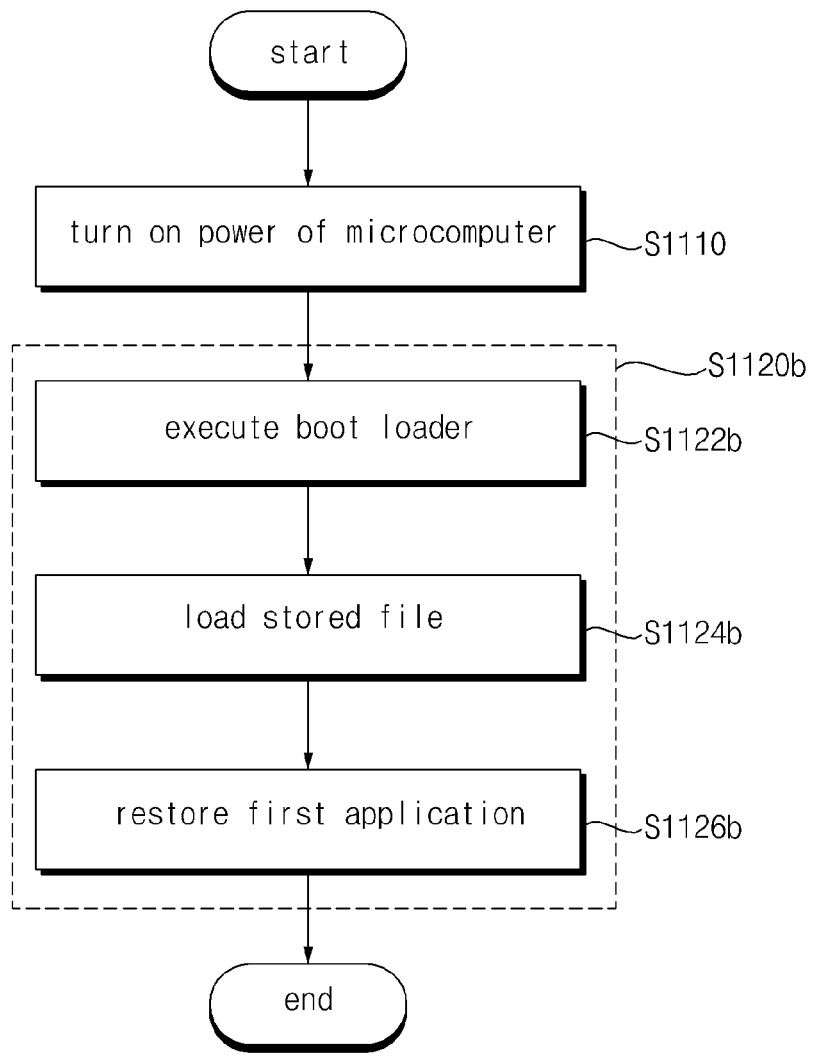

First, FIG. 11C is a diagram referred to for description of the hibernation mode of FIG. 11A or 11B.

Referring to the figure, according to the hibernation mode, the processor 175 may execute a boot loader (S1122b).

Next, according to the execution of the boot loader, the second memory 140b may load the file stored in the first memory 140a (S1124b). The file stored in the first memory 140a at this time may be an image file related to the first application.

Specifically, it may be a file corresponding to a final first application upon entering the standby mode.

Next, the processor 175 may control the first application to be restored based on the file loaded in the second memory 140b (S1126b).

Accordingly, it is possible to quickly restore the first application. Furthermore, the booting period or wakeup period of the first application can be shortened.

Figure 12A:
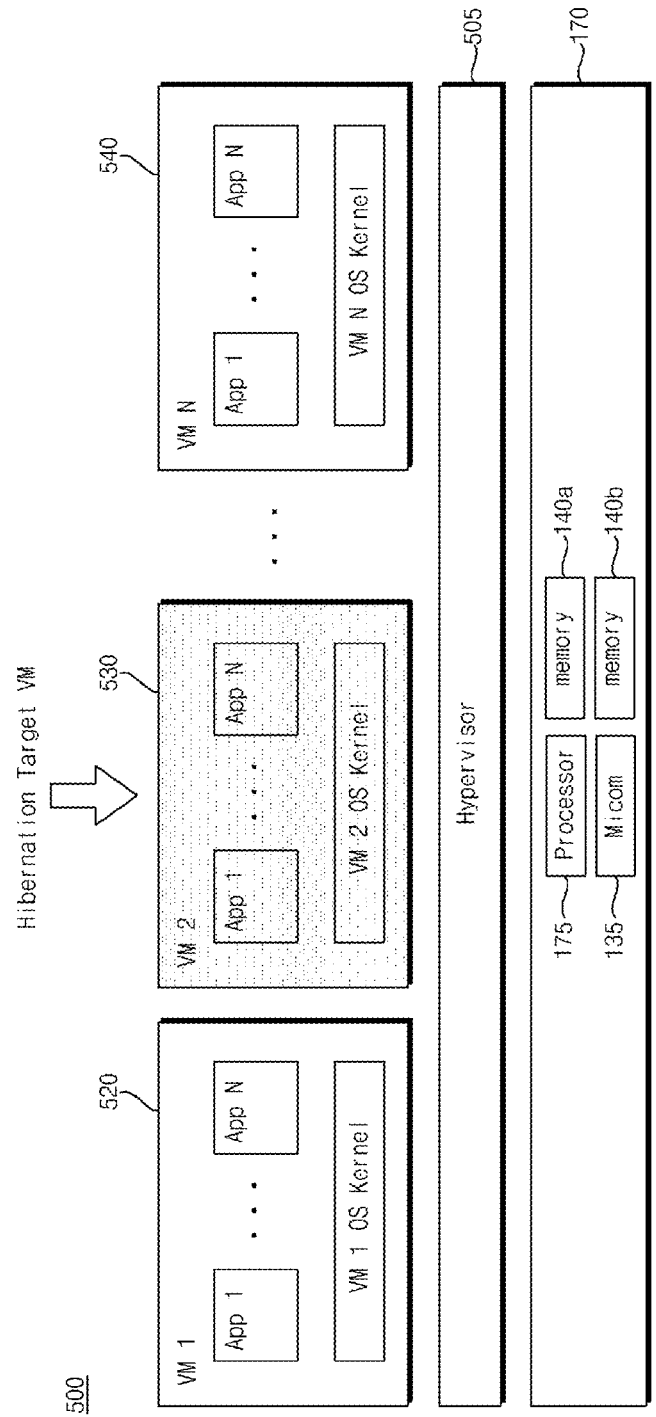
Figure 12B:
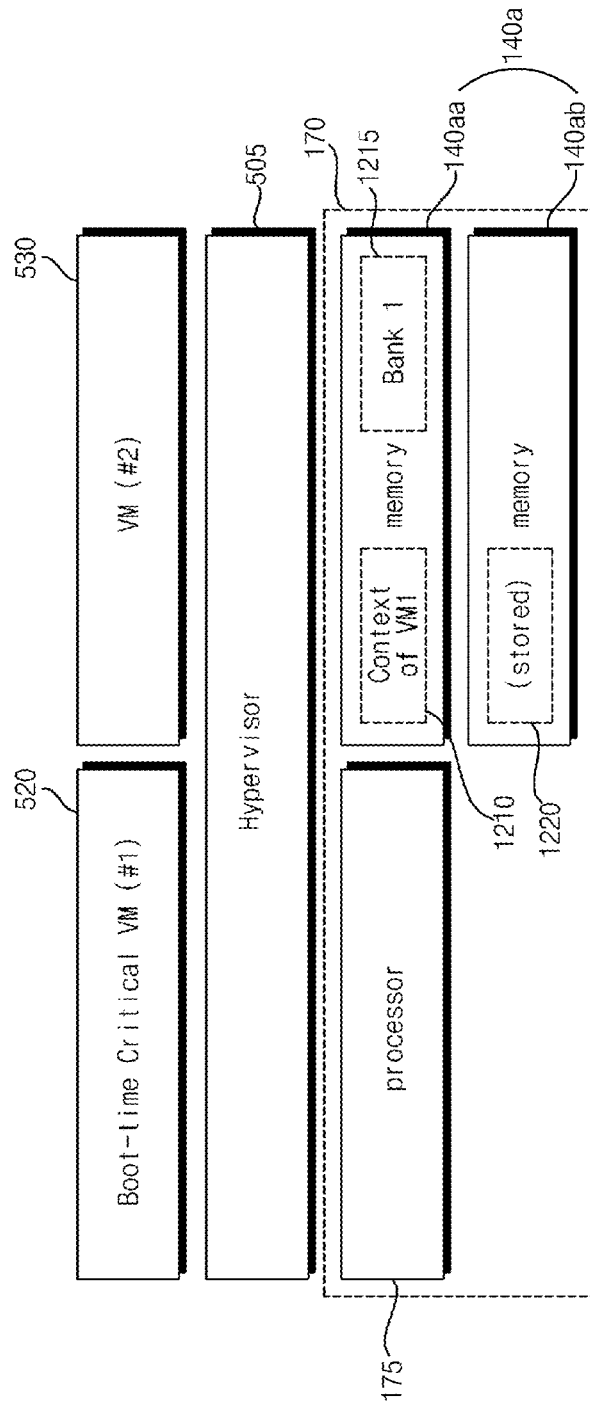

FIG. 12A illustrates that the hibernation mode is performed in the first guest virtual machine 530 among a plurality of virtual machines, and FIG. 12B is a diagram referred to in the description of FIG. 12A.

Referring to FIG. 12A, upon entering the standby mode, the first guest virtual machine 530 may store a file 1220 related to an executed application in a partial region 140ab of the first memory 140a as shown in FIG. 12B.

Meanwhile, as shown in FIG. 12B, files 1210 and 1215 used by a hypervisor in relation to the first guest virtual machine 530 may be stored in another region 140aa of the first memory 140a.

Meanwhile, in the standby mode, only in the region in which the file 1220 related to the application is stored, in a partial region 140ab of the first memory 140a may be powered on. Accordingly, standby power consumption in the standby mode can be reduced.

Meanwhile, in the standby mode, power may be turned on only in the region in which the files 1210 and 1215 are stored, in the other region 140aa of the first memory 140a. Accordingly, standby power consumption in the standby mode can be reduced.

Meanwhile, in standby mode, processor 175 is powered off.

Also, when switching from the standby mode to the active mode, the second memory 140b may load the file stored in the first memory 140a. Also, the processor 175 quickly may restore and execute the application executed in the first guest virtual machine 530 based on the file loaded in the second memory 140b.

Meanwhile, referring to FIGS. 12A and 12B, the virtual machines 520 and 540 excluding the first guest virtual machine 530 may perform a booting operation according to the normal booting mode.

Figure 12C:
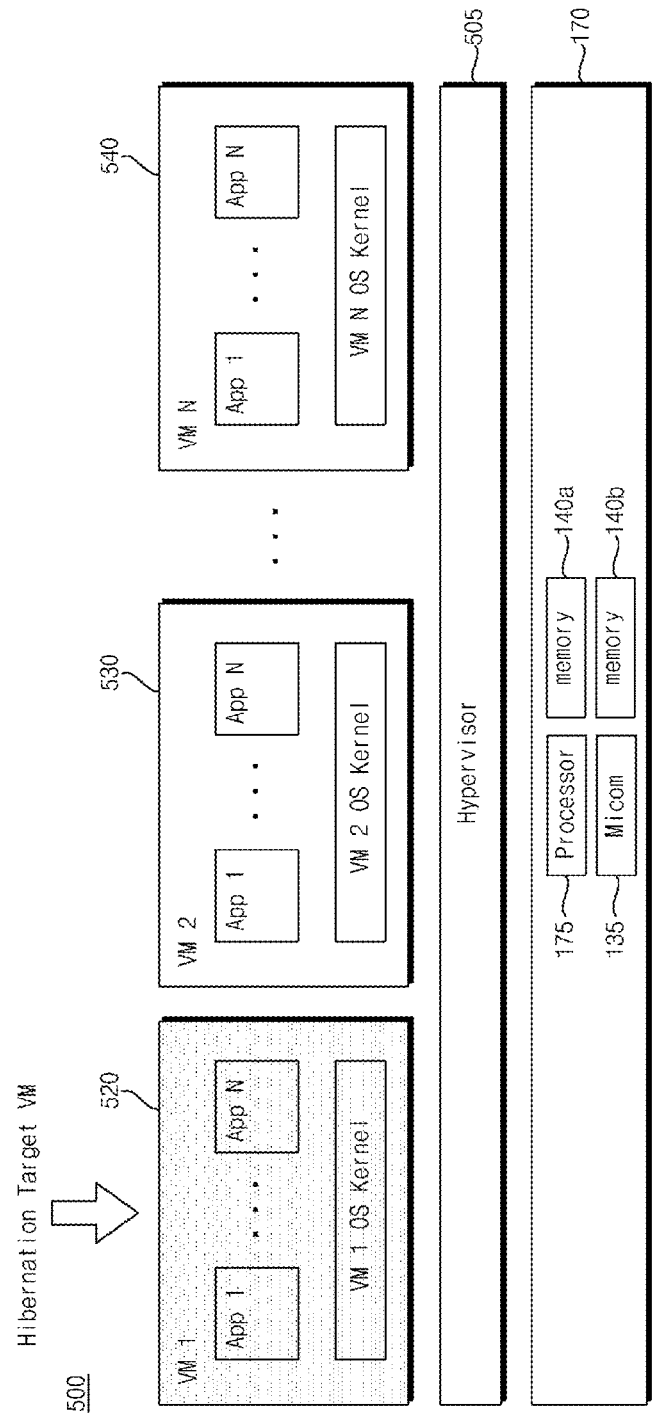

FIG. 12C illustrates that the hibernation mode is performed in the server virtual machine 520 among a plurality of virtual machines.

Referring to FIG. 12A, upon entering the standby mode, the server virtual machine 520 stores a file related to an application being executed in a partial region of the first memory 140*a*.

Meanwhile, in the standby mode, only in a region in which a file related to an application is stored, in the partial region 140*ab* of the first memory 140*a*, may be powered on. Accordingly, standby power consumption in the standby mode can be reduced.

Also, when switching from the standby mode to the active mode, the second memory 140*b* may load the file stored in the first memory 140*a*. Also, the processor 175 quickly may restore and execute the application that was executed in the server virtual machine 520 based on the file loaded in the second memory 140*b*.

Figure 13:
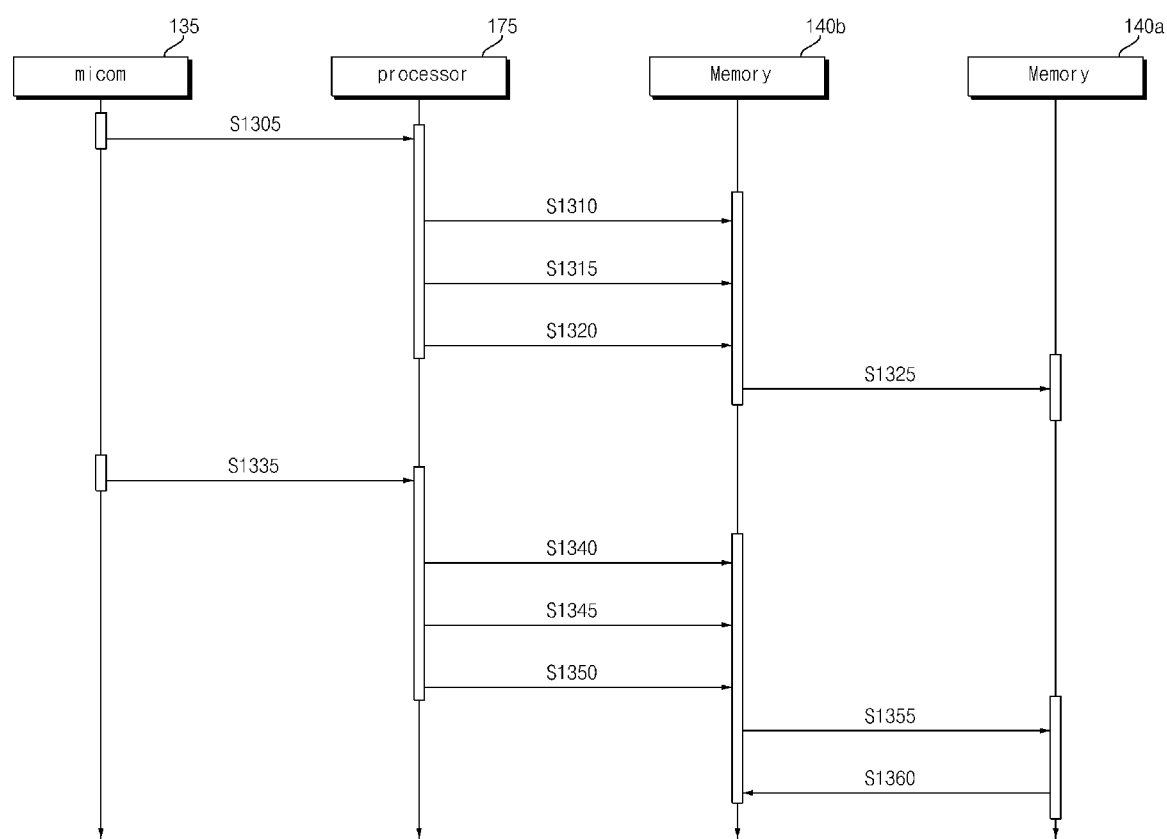

FIG. 13 is a diagram illustrating the standby mode and the active mode.

Referring to the figure, the microcomputer 135 may transmit a power OFF signal to the processor 175 upon entering the standby mode (S1305).

Next, the processor 175 may transmit a memory cleaning command to the second memory 140*b* (S1310). Accordingly, the second memory 140*b* organizes the inside of the memory.

Next, the processor 175 may request the second memory 140*b* to terminate a virtual machine that is not an important virtual machine (S1315). Accordingly, the second memory 140*b* can terminate the virtual machine that is not an important virtual machine.

Next, the processor 175 may provide information on an important virtual machine to the second memory 140*b* (S1320).

Accordingly, the second memory 140*b* may transmit a file related to an important application to the first memory 140*a* in order to perform the hibernation mode of the important virtual machine. Accordingly, the first memory 140*a* can store the file related to the important application.

Next, as the standby mode may be switched to the active mode, a power ON signal may be transmitted to the processor 175 (S1335).

Next, the processor 175 may transmit a wake-up command to the second memory 140*b* (S1340).

Next, the processor 175 may request wakeup of a virtual machine that is not an important virtual machine from the second memory 140*b* (S1345).

Accordingly, the second memory 140*b* can allow the virtual machine that is not an important virtual machine to perform the normal booting mode.

Next, the processor 175 requests wakeup of the important virtual machine from the second memory 140*b* (S1350).

Accordingly, the second memory 140*b* may request file transmission related to the important application from the first memory 140*a* to perform the hibernation mode of the important virtual machine (S1355).

Accordingly, the first memory 140*a* may transmit a file related to the important application to the second memory 140*b* (S1360).

Then, the second memory 140*b* may load the file related to the important application, and the processor 175 may control the first application to be restored based on the file loaded in the second memory 140*b*. Accordingly, the booting period or wakeup period of some applications running in the vehicle can be shortened.

Figure 14A:
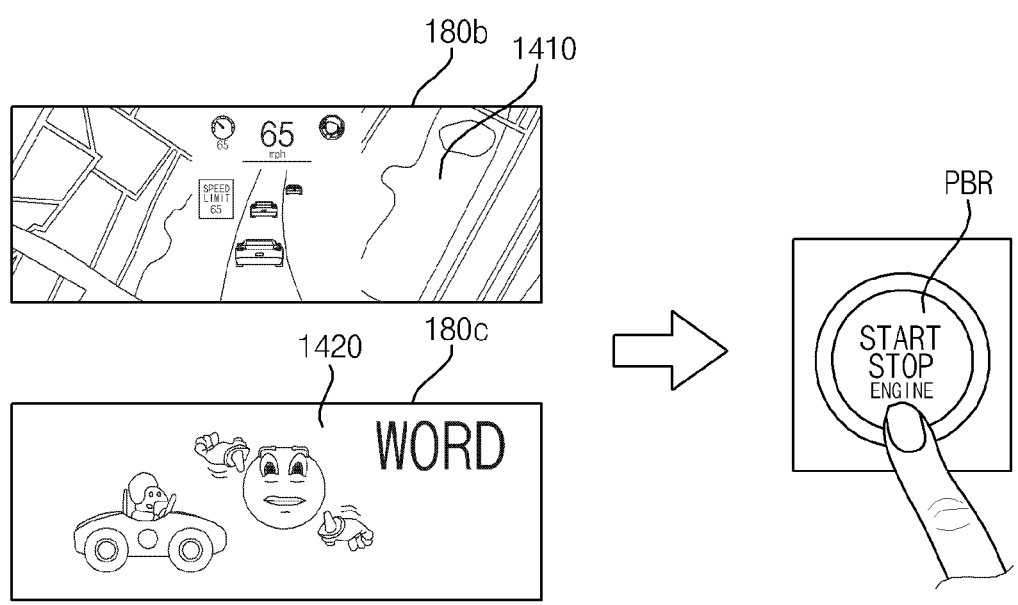

FIG. 14A illustrates that a power button PBR is pressed while respective application execution images are displayed on the second display 180*b* and the third display 180*c*.

For example, when a power OFF button OBR is pressed while a navigation application image 1410 is displayed on the second display 180*b* and a game application image 1420 is displayed on the third display 180*c*, the standby mode may be entered.

Meanwhile, the processor 175 may set a navigation application, among the navigation application and a game application, as an important application.

Accordingly, based on the entry into the standby mode, the game application may be terminated without separate storage, and a file related to the navigation application may be stored in the first memory 140*a*.

Figure 14B:
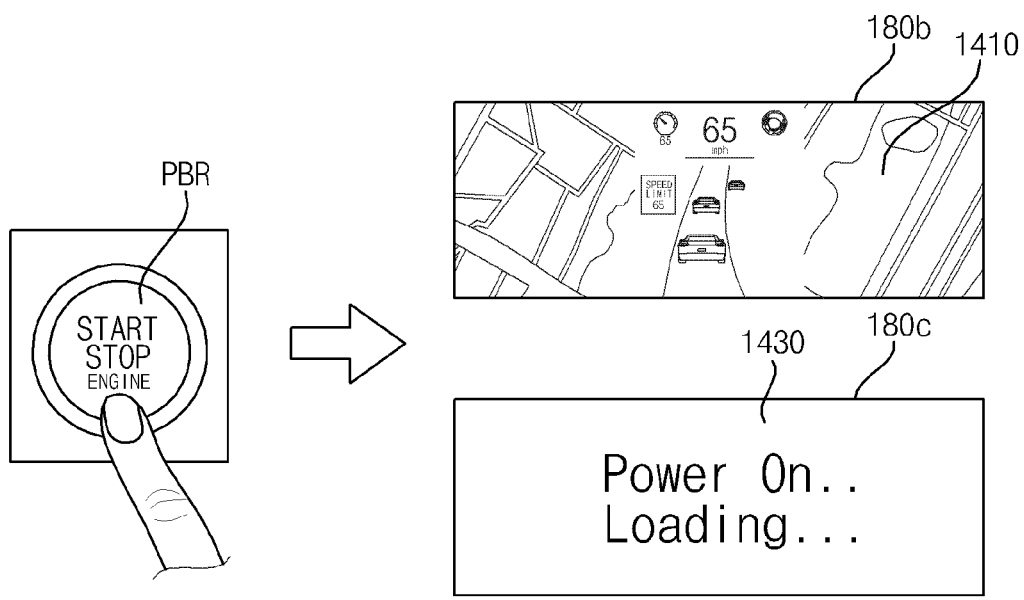

FIG. 14B is a diagram illustrating switching from the standby mode to the active mode by pressing the power button PBR.

Referring to the figure, based on switching from the standby mode to the active mode, the file related to the application stored in the first memory 140*a* may be loaded into the second memory 140*b* and eventually restored quickly in the processor 175.

As shown in the figure, based on the switching from the standby mode to the active mode, the processor 175 may be configured to restore a first application to display a first image 1410 corresponding to the first application on the second display 180*b* at a first time point and may be configured to display a second image indicating being loaded in response to non-execution of the second application on the display 180*c*.

In this manner, by varying the booting period or the wakeup period by classifying applications, standby power consumption can be reduced.

Meanwhile, based on the switching from the standby mode to the active mode, the processor 175 may be configured to continuously display the first image 1410 at a second time point after the first time point and may be configured to display the third image 1420 corresponding to the execution of the second application. In this manner, by varying the booting period or the wakeup period by classifying applications, standby power consumption can be reduced.

Figure 15A:
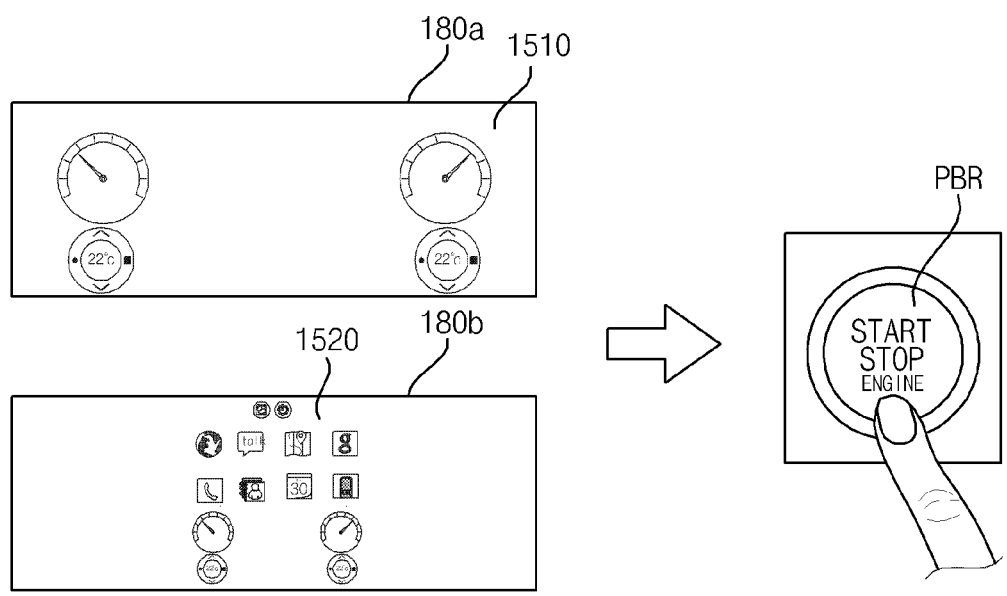

FIG. 15A illustrates that the power button PBR is pressed while respective application execution images are displayed on the first display 180*a* and the second display 180*b*.

For example, when the power OFF button OBR is pressed while a vehicle information application image 1510 is displayed on the first display 180*a* and a home screen application image 1520 is displayed on the second display 180*b*, the standby mode may be entered.

Meanwhile, the processor 175 may set the vehicle information application, among the vehicle information application and the home screen application, as an important application.

Accordingly, based on the entry into the standby mode, the home screen application may be terminated without separate storage, and a file related to the vehicle information application may be stored in the first memory 140*a*.

Figure 15B:
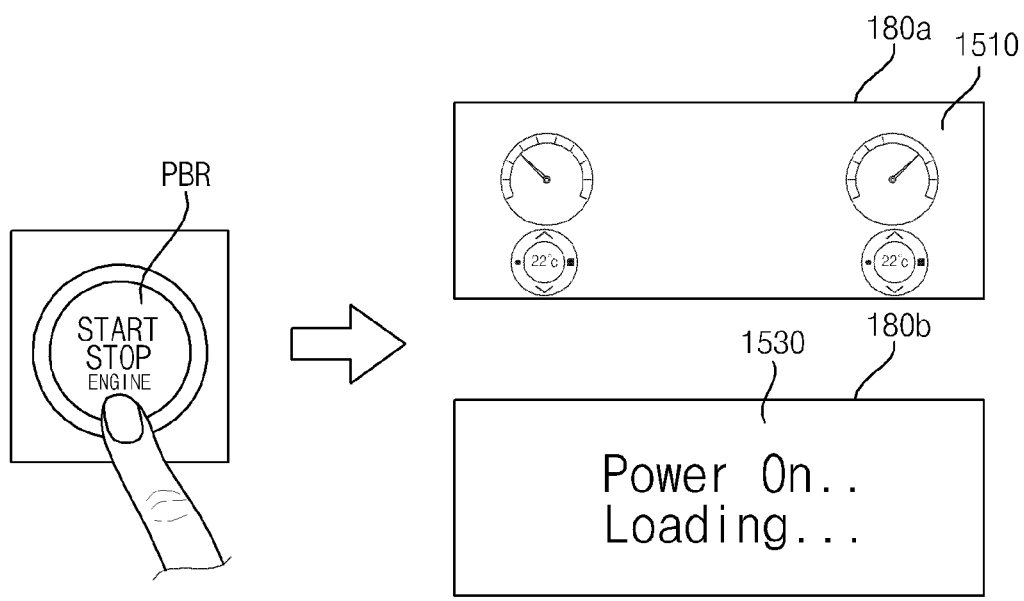

FIG. 15B is a diagram illustrating switching from the standby mode to the active mode by pressing the power button PBR.

Referring to the figure, based on the switching from the standby mode to the active mode, the file related to the application stored in the first memory 140*a* may be loaded into the second memory 140*b*, and eventually quickly restored in the processor 175.

As shown in the figure, based on the switching from the standby mode to the active mode, the processor 175 may be configured to restore the first application and display the first image 1510 corresponding to the first application on the first display 180a, and may be configured to display the second image 1530 indicating being loaded in response to non-execution of the second application on the second display 180b at a first time point.

In this manner, by varying the booting period or the wakeup period by classifying applications, standby power consumption can be reduced.

Meanwhile, based on the switching from the standby mode to the active mode, the processor 175 may be configured to continuously display the first image 1510 at a second time point after the first time point and may be configured to display the third image 1520 corresponding to the second application. In this manner, by varying the booting period or the wakeup period by classifying applications, standby power consumption can be reduced.

It will be apparent that, although the preferred embodiments have been shown and described above, the present disclosure is not limited to the above-described specific embodiments, and various modifications and variations may be made by those skilled in the art without departing from the gist of the appended claims. Thus, it is intended that the modifications and variations should not be understood independently of the technical spirit or prospect of the present disclosure.

What is claimed is:

1. A signal processing device comprising:
a processor configured to execute hypervisor, and a plurality of virtual machines for a plurality of displays mounted on a vehicle, wherein the plurality of virtual machines are executed on the hypervisor;
a first memory configured to store a first file corresponding to a first application executed in a first virtual machine of the plurality of virtual machines based on entry into a standby mode; and
a second memory configured to load the first file stored in the first memory based on a switching from the standby mode to an active mode,
the processor is configured to:
enter a standby mode, when the a power off button is pressed while a first image of a first application is displayed on a first display of the plurality of displays and a second image of a second application image is displayed on a second display of the plurality of displays,
in response to the entry into the standby mode;
terminate a second application corresponding to the second application image and executed in a second virtual machine among the plurality of virtual machines without a separate storage operation, and
store the first file corresponding to the first application having a higher importance than the second application in the first memory,
in response to the switching from the standby mode to the active mode:
perform a first booting mode for the first virtual machine, and
after performing the first booting mode, perform a second booting mode, for the second virtual machine, wherein the first virtual machine is configured to perform the second booting mode for the second virtual machine,
wherein the processor is further configured to:
in the first booting mode, restore the first application in response to the first file being loaded to the second memory from the first memory,
at a first time point, display a first image corresponding to the first application and display a second image indicating that the second image is being loaded in response to non-execution of the second application, and
in the second booting mode, turn on the hypervisor, turn on the second virtual machine in which the second application was terminated after the hypervisor is turned on, and execute the second application after an operating system is executed.

2. The signal processing device of claim 1, wherein, in the standby mode, the first memory is configured to maintain power only in a region storing the first file and turn off power in other regions.

3. The signal processing device of claim 1, wherein, based on the switching from the standby mode to the active mode, the processor is configured to continuously display the first image at a second time point after the first time point, and display a third image corresponding to the execution of the second application.

4. The signal processing device of claim 1, wherein the first application includes any one of a system check application, a cluster application, or a rear camera application, and
wherein the second application includes any one of a home screen application and a media playback application.

5. The signal processing device of claim 1, wherein the first application operates based on a first operating system, and wherein the second application operates based on a second operating system different from the first operating system.

6. The signal processing device of claim 1, wherein the first application is executed in a first guest virtual machine among the plurality of virtual machines, and
wherein the second application is executed in a second guest virtual machine among the plurality of virtual machines.

7. The signal processing device of claim 1, wherein the first application is executed in a server virtual machine among the plurality of virtual machines, and
wherein the second application is executed in a guest virtual machine among the plurality of virtual machines.

8. The signal processing device of claim 1, wherein the first memory further stores an image of the first file including an operating system,
wherein the processor is configured to terminate the second application executed in the second virtual machine among the plurality of virtual machines based on entry into the standby mode, and
wherein the processor is configured to turn on the second virtual machine based on the switching from the standby mode to the active mode, and
wherein after the operating system is executed in the second memory based on loading of the image of the first file stored in the first memory, the processor is configured to execute the second application.

9. The signal processing device of claim 1, wherein, based on the switching from the standby mode to the active mode, the processor is configured to turn on the hypervisor after power-ON of a microcomputer and turn on the second virtual machine after turning on the hypervisor, and
wherein after the operating system is executed in the second memory based on loading of the first file stored in the first memory, the processor is configured to execute the second application.

10. The signal processing device of claim 1, wherein the processor is configured to execute the first virtual machine, the second virtual machine and to a third virtual machine on the hypervisor in the processor, and
wherein the second virtual machine operates for a first display and the third virtual machine operates for a second display.

11. The signal processing device of claim 10, wherein the first virtual machine in the processor is configured to receive a touch input for the first display or the second display, and transmit information on the touch input to the second virtual machine or the third virtual machine.

12. The signal processing device of claim 11, wherein the first virtual machine is configured to store coordinate information of the touch input in a shared memory.

13. The signal processing device of claim 12, wherein the first virtual machine is configured to transmit a buffer index regarding the shared memory to the second virtual machine or the third virtual machine, and
wherein the second virtual machine or the third virtual machine is configured to read the coordinate information of the touch input written in the shared memory based on the received buffer index.

14. The signal processing device of claim 10, wherein the first virtual machine comprises an input and output server interface,
wherein each of the second virtual machine and the third virtual machine comprises an input and output client interface,
wherein the input and output server interface in the first virtual machine is configured to store coordinate information of a touch input in a shared memory, and
wherein an input and output client interface in the second virtual machine or the third virtual machine is configured to read the coordinate information of the touch input written in the shared memory.

15. The signal processing device of claim 1, wherein the processor is configured to further execute a fourth virtual machine operating for a third display on the hypervisor in the processor.

16. The signal processing device of claim 10, wherein the first virtual machine is configured to receive and process wheel speed sensor data of the vehicle, and transmit an overlay indicating the processed wheel speed sensor data or speed information corresponding to the processed wheel speed sensor data to at least one of the second virtual machine or the third virtual machine.

17. The signal processing device of claim 1, wherein the plurality of virtual machines includes a server virtual machine and at least one guest virtual machine,
wherein only the server virtual machine among the plurality of virtual machines is configured to receive audio data or wireless communication data, or touch input, and
wherein the server virtual machine is configured to transmit the audio data or data processed based on the audio data or the wireless communication data or data processed based on the wireless communication data or information regarding the touch input using a shared memory based on the hypervisor to the at least one guest virtual machine.

18. A display apparatus for vehicles, the display apparatus comprising:
a first display;
a second display; and
a signal processing device comprising a processor configured to perform signal processing for the first display and the second display, and wherein the signal processing device comprises:
a processor configured to execute hypervisor, and a plurality of virtual machines for a plurality of displays mounted on a vehicle,
wherein the plurality of virtual machines are executed on the hypervisor;
a first memory configured to store a first file corresponding to a first application executed in a first virtual machine of the plurality of virtual machines based on entry into a standby mode; and
a second memory configured to load the first file stored in the first memory based on switching from the standby mode to an active mode,
the processor is configured to:
enter a standby mode, when a power off button is pressed while a first image of a first application is displayed on a first display of the plurality of displays and a second image of a second application image is displayed on a second display of the plurality of displays,
in response to the entry into the standby mode:
terminate a second application corresponding to the second application image and executed in a second virtual machine among the plurality of virtual machines without a separate storage operation, and
store the first file corresponding to the first application having a higher importance than the second application in the first memory,
in response to the switching from the standby mode to the active mode:
perform a first booting mode for the first virtual machine, and
after performing the first booting mode, perform a second booting mode, for the second virtual machine, wherein the first virtual machine is configured to perform the second booting mode for the second virtual machine,
wherein the processor is further configured to:
in the first booting mode, restore the first application based on the first file loaded to the second memory from the first memory,
at a first time point, display a first image corresponding to the first application and display a second image indicating that the second image is being loaded in response to non-execution of the second application, and
in the second booting mode, turn on the hypervisor, turn on the second virtual machine in which the second application was terminated after the hypervisor is turned on, and execute the second application after an operating system is executed.

19. The display apparatus of claim 18, wherein the plurality of virtual machines includes a server virtual machine and at least one guest virtual machine,
wherein only the server virtual machine among the plurality of virtual machines is configured to receive audio data or wireless communication data, or touch input, and
wherein the server virtual machine is configured to transmit the audio data or data processed based on the audio data or the wireless communication data or data processed based on the wireless communication data or information regarding the touch input using a shared memory based on the hypervisor to the at least one guest virtual machine.

* * * * *